US010905941B2

(12) United States Patent
Hong

(10) Patent No.: US 10,905,941 B2
(45) Date of Patent: Feb. 2, 2021

(54) DART GAME APPARATUS AND COMPUTER PROGRAM STORED IN COMPUTER-READABLE MEDIUM FOR PROVIDING MULTIMEDIA INFORMATION

(71) Applicant: HONG INTERNATIONAL CORP., Seoul (KR)

(72) Inventor: Sang Uk Hong, Seoul (KR)

(73) Assignee: Phoenixdarts Co., Ltd., Seoul (KR)

( * ) Notice: Subject to any disclaimer, the term of this patent is extended or adjusted under 35 U.S.C. 154(b) by 60 days.

(21) Appl. No.: 15/544,869

(22) PCT Filed: May 18, 2017

(86) PCT No.: PCT/KR2017/005158
§ 371 (c)(1),
(2) Date: Feb. 26, 2019

(87) PCT Pub. No.: WO2018/143517
PCT Pub. Date: Aug. 9, 2018

(65) Prior Publication Data
US 2019/0184274 A1 Jun. 20, 2019

(30) Foreign Application Priority Data

Feb. 2, 2017 (KR) .................... 10-2017-0014793
Apr. 14, 2017 (KR) .................... 10-2017-0048551

(51) Int. Cl.
*A63F 9/02* (2006.01)
*A63F 13/837* (2014.01)
(Continued)

(52) U.S. Cl.
CPC ............ *A63F 9/0208* (2013.01); *A63F 13/46* (2014.09); *A63F 13/837* (2014.09); *F41J 3/0009* (2013.01);
(Continued)

(58) Field of Classification Search
CPC ........ A63F 13/45; A63F 13/30; A63F 13/822; A63F 13/837; A63F 13/46; F41J 3/0019; F41J 3/0009; F41J 5/04; F41J 5/14
(Continued)

(56) References Cited

U.S. PATENT DOCUMENTS 4,678,194 A 7/1987 Bowyer et al.
4,824,121 A 4/1989 Beall
(Continued)

FOREIGN PATENT DOCUMENTS

GB 2445123 A 6/2008
JP 07-144038 6/1995
(Continued)

OTHER PUBLICATIONS

International Search Report for PCT/KR2017/005158 dated Nov. 2, 2017.
(Continued)

*Primary Examiner* — Michael A Cuff
(74) *Attorney, Agent, or Firm* — Martin & Ferraro, LLP

(57) ABSTRACT

Disclosed is a dart game apparatus according to exemplary embodiments of the present disclosure. The dart game apparatus may include: a dart target capable of accommodating a thrown dart pin; a sensing unit sensing a hit location of a thrown dart pin; a controller determining score information depending on each of one or more dart pins thrown by a first player based on information on the hit location, which is received from the sensing unit, determining the determined respective score information of the first player to be output in response to throwing of the respective dart pins, permitting a second player to throw the dart pins when it is sensed that a round of the first player ends, determining the score information depending on each of one or more dart pins thrown by the second player, comparing the determined
(Continued)

respective score information of the second player with current score information of the first player, and determining whether the current score information depending on throwing of the dart pins of the second player is output in association with comparison result information based on a result of the comparison; and an output unit outputting the score information depending on the throwing of the dart pins and the result information of the comparison according to the control by the controller.

16 Claims, 14 Drawing Sheets

(51) Int. Cl.
| | | |
|---|---|---|
| A63F 13/46 | (2014.01) | |
| F41J 5/04 | (2006.01) | |
| F41J 3/00 | (2006.01) | |
| F42B 12/36 | (2006.01) | |
| F41J 5/14 | (2006.01) | |
| F42B 12/38 | (2006.01) | |

(52) U.S. Cl.
CPC ............ *F41J 3/0019* (2013.01); *F41J 3/0028* (2013.01); *F41J 5/04* (2013.01); *F41J 5/14* (2013.01); *F42B 12/365* (2013.01); *F42B 12/385* (2013.01); *A63F 2009/0221* (2013.01)

(58) Field of Classification Search
USPC .................................................. 273/376, 348
See application file for complete search history.

(56) References Cited

U.S. PATENT DOCUMENTS

| | | | | |
|---|---|---|---|---|
| 5,114,155 | A | 5/1992 | Tillery | |
| 5,559,490 | A * | 9/1996 | McDonald | F41J 3/02 340/323 R |
| 5,593,349 | A | 1/1997 | Miguel et al. | |
| 5,648,752 | A * | 7/1997 | Alfrey | F41J 5/00 340/323 R |
| 5,662,333 | A | 9/1997 | Allen | |
| 5,857,912 | A | 1/1999 | Freitag | |
| 5,882,111 | A * | 3/1999 | Chen | F41J 3/02 273/371 |
| 5,971,397 | A * | 10/1999 | Miguel | F41J 3/00 273/371 |
| 6,076,021 | A * | 6/2000 | Houriet, Jr. | F41J 3/02 273/371 |
| 6,439,576 | B1 | 8/2002 | Montague | |
| 6,957,398 | B1 * | 10/2005 | Nayeri | G06F 16/9535 715/867 |
| 7,470,197 | B2 | 12/2008 | Massey | |
| 7,985,125 | B2 | 7/2011 | Kagami et al. | |
| 8,075,430 | B1 | 12/2011 | Hester | |
| 8,540,578 | B2 | 9/2013 | Kobayashi | |
| 8,727,892 | B1 | 5/2014 | Chunn | |
| 8,814,647 | B2 | 8/2014 | Palmer | |
| 2001/0053722 | A1 | 12/2001 | Miller | |
| 2002/0075238 | A1 * | 6/2002 | Fougere | G09G 3/04 345/168 |
| 2002/0111213 | A1 | 8/2002 | McEntee et al. | |
| 2002/0135131 | A1 * | 9/2002 | Martin | F41J 3/00 273/371 |
| 2004/0121855 | A1 * | 6/2004 | Giegerich | F41J 3/02 473/371 |
| 2005/0006847 | A1 * | 1/2005 | Ross | F41J 5/22 273/374 |
| 2005/0075153 | A1 * | 4/2005 | Valero Moreno | G07F 17/38 463/1 |
| 2005/0121855 | A1 * | 6/2005 | Noda | F41J 5/14 273/348 |
| 2005/0209008 | A1 | 9/2005 | Shimizu et al. | |
| 2006/0154756 | A1 | 7/2006 | Shao | |
| 2006/0247055 | A1 | 11/2006 | O'Kelley, II et al. | |
| 2008/0012233 | A1 * | 1/2008 | Giegerich | F41J 5/14 273/376 |
| 2008/0234021 | A1 * | 9/2008 | Palmer | G07F 17/38 463/2 |
| 2009/0098958 | A1 | 4/2009 | Miner | |
| 2009/0176559 | A1 | 7/2009 | Buchholz et al. | |
| 2010/0167848 | A1 | 7/2010 | Tsai | |
| 2010/0176555 | A1 * | 7/2010 | Noda | F41J 3/00 273/371 |
| 2011/0151969 | A1 | 6/2011 | Kobayashi et al. | |
| 2012/0083331 | A1 * | 4/2012 | Carpenter | G07F 17/323 463/25 |
| 2012/0083342 | A1 * | 4/2012 | Cross | F41J 3/0009 463/42 |
| 2012/0094762 | A1 | 4/2012 | Khan | |
| 2012/0242043 | A1 * | 9/2012 | Hong | F41J 5/14 273/348 |
| 2012/0258788 | A1 | 10/2012 | Hong | |
| 2012/0295677 | A1 | 11/2012 | Ok | |
| 2012/0315986 | A1 | 12/2012 | Walling | |
| 2013/0165229 | A1 | 6/2013 | Park | |
| 2013/0210507 | A1 | 8/2013 | Wayans | |
| 2013/0220160 | A1 | 8/2013 | Burdine et al. | |
| 2014/0087897 | A1 | 3/2014 | Nally | |
| 2014/0151965 | A1 | 6/2014 | Garas | |
| 2014/0195929 | A1 | 7/2014 | Crocker et al. | |
| 2015/0237239 | A1 | 8/2015 | Lyren et al. | |
| 2015/0308793 | A1 * | 10/2015 | Hong | F41J 5/04 273/371 |
| 2015/0336011 | A1 | 11/2015 | Hong | |
| 2015/0360133 | A1 * | 12/2015 | Maccallum | A63F 13/35 463/42 |
| 2016/0084618 | A1 * | 3/2016 | Hong | A63F 9/0208 273/371 |
| 2016/0236091 | A1 | 8/2016 | Hong | |
| 2016/0271499 | A1 | 9/2016 | Higo | |
| 2016/0290772 | A1 * | 10/2016 | Hong | F41J 5/04 |
| 2016/0364953 | A1 * | 12/2016 | Hong | F41J 3/0009 |
| 2017/0167832 | A1 * | 6/2017 | Hong | H04N 7/181 |
| 2017/0178452 | A1 * | 6/2017 | Hong | A63F 13/245 |
| 2017/0189810 | A1 * | 7/2017 | Hong | A63F 13/58 |
| 2017/0252654 | A1 * | 9/2017 | Hong | G06Q 50/10 |
| 2017/0266562 | A1 * | 9/2017 | Hong | A63F 13/20 |
| 2017/0326444 | A1 * | 11/2017 | Hong | A63F 9/0204 |
| 2017/0370682 | A1 * | 12/2017 | Hong | A63F 13/46 |
| 2018/0001195 | A1 | 1/2018 | Watanabe | |
| 2018/0056193 | A1 * | 3/2018 | Hong | A63F 9/0278 |
| 2018/0266794 | A1 * | 9/2018 | Hong | G09B 19/22 |
| 2018/0311584 | A1 * | 11/2018 | Hong | F41J 3/02 |
| 2019/0249962 | A1 * | 8/2019 | Hong | G07F 17/3202 |
| 2019/0293449 | A1 * | 9/2019 | Okada | G01C 21/28 |

FOREIGN PATENT DOCUMENTS

| | | |
|---|---|---|
| JP | 07-200123 | 8/1995 |
| JP | 2001-195182 | 7/2001 |
| JP | 2002-045455 | 2/2002 |
| JP | 2002-157082 | 5/2002 |
| JP | 2002-236731 | 8/2002 |
| JP | 2003-108549 | 4/2003 |
| JP | 2007-296198 | 11/2007 |
| JP | 2008-061755 | 3/2008 |
| JP | 2008-225870 | 9/2008 |
| JP | 2008-538318 | 10/2008 |
| JP | 2009-247548 | 10/2009 |
| JP | 2010-220784 | 10/2010 |
| JP | 2010-279610 | 12/2010 |
| JP | 2011-103917 | 6/2011 |
| JP | 2011-110074 | 6/2011 |
| JP | 5201860 B2 | 6/2013 |
| JP | 2013-128775 | 7/2013 |
| JP | 2013-154085 A | 8/2013 |
| JP | 2013-165906 | 8/2013 |
| KR | 10-1998-0016409 A | 6/1998 |
| KR | 10-2004-0013864 A | 8/2002 |

(56) References Cited

FOREIGN PATENT DOCUMENTS

| KR | 10-2002-0081561 | 10/2002 |
|---|---|---|
| KR | 10-2004-0013864 | 2/2004 |
| KR | 10-2007-0062658 | 6/2007 |
| KR | 10-2007-0068820 A | 7/2007 |
| KR | 10-0824354 | 4/2008 |
| KR | 10-0824742 B1 | 4/2008 |
| KR | 10-2008-0077301 | 8/2008 |
| KR | 10-2008-010133 | 11/2008 |
| KR | 10-2009-0036820 | 4/2009 |
| KR | 10-0970678 B1 | 7/2010 |
| KR | 10-2010-0095346 | 8/2010 |
| KR | 10-2011-0021057 A | 3/2011 |
| KR | 10-2011-0021069 A | 3/2011 |
| KR | 10-2012-0035747 | 4/2012 |
| KR | 10-2012-0090374 | 8/2012 |
| KR | 10-2012-0205839 | 9/2012 |
| KR | 10-2012-0114894 | 10/2012 |
| KR | 10-2013-0062456 | 6/2013 |
| KR | 10-2014-0033529 | 3/2014 |
| KR | 1020140054983 | 5/2014 |
| KR | 10-1410493 B1 | 6/2014 |
| KR | 10-2014-0112124 A | 9/2014 |
| KR | 10-2014-0131081 A | 11/2014 |
| KR | 10-2010-0072557 A | 7/2017 |
| WO | WO2013/082546 | 6/2013 |

OTHER PUBLICATIONS

Summer Festival 2015, Hong International Corp., Aug. 8, 2015, 7 pgs.
VSPHOENIXS, Perfect Dart System VSPHOENIX, Virtual Darts, Summer Festival 2015, Aug. 8, 2015.

* cited by examiner

DART GAME APPARATUS AND COMPUTER PROGRAM STORED IN COMPUTER-READABLE MEDIUM FOR PROVIDING MULTIMEDIA INFORMATION

CROSS-REFERENCE TO RELATED APPLICATIONS

This application is a National Phase Application under 35 USC 371 of PCT/KR2017/005158 filed May 18, 2017, which claims priority to and the benefit of Korean Patent Application No. 10-2017-0014793 filed in the Korean Intellectual Property Office on Feb. 02, 2017 and Korean Patent Application No. 10-2017-0048551 filed in the Korean Intellectual Property Office on Apr. 14, 2017, the entire contents of which are incorporated herein by reference.

TECHNICAL FIELD

The present disclosure relates to a dart game apparatus, and more particularly, to a dart game apparatus and a computer program for providing multimedia information.

BACKGROUND ART

In general, a dart means a 'small arrow' and is a game that makes a point by throwing an arrow-shaped dart pin to a centrifugal target with numerical figures, and a dart game has an advantage in that anyone can enjoy the dart game anywhere and anytime regardless of a season if only an arrowhead-shaped dart and a dart target are provided.

In general, participants of the dart game need to participate in the game at the same time and in the same space in order to enjoy the dart game. However, with the development of a communication technology, electronic dart game apparatuses have been developed in which each of the participants of the dart game may remotely participate in the dart game so as to participate in the game over temporal and spatial constraints and remotely transmit a play result or a play process thereof through a communication network. The electronic dart game apparatuses may electrically sense a hitting point of the dart target and automatically aggregate scores and provide the aggregated scores to a user.

Korean Patent Registration No. 10-0824354 associated therewith discloses Electronic Dart Game Device Using Internet Network.

In recent years, as various game methods have been developed and a scoring method has been organized, the dart game has been developed as worldwide leisure sports, and therefore, men and women of all ages have easily enjoyed the dart game.

However, since all processes of the dart game are constituted by a simple process in which the scores are aggregated by throwing the dart pin due to an essential characteristic of the dart game, the need for increasing an entertainment element of the dart game may exist in the art.

SUMMARY OF THE INVENTION

The present disclosure has been made in an effort to increase an entertainment element of a dart game.

An exemplary embodiment of the present disclosure provides a dart game apparatus providing individual specialized multimedia information. The dart game apparatus may include: a memory; a processor; a dart target capable of accommodating a thrown dart pin; a sensing unit sensing a hit location of a thrown dart pin; a player input unit receiving a player input; a player information acquisition unit acquiring player information from at least one of the player input unit and player identification means; an individual specialized multimedia information acquisition unit acquiring the individual specialized multimedia information of the player when the individual specialized multimedia information of the player is not stored in the memory; and an output unit outputting the individual specialized multimedia information of the player when a predetermined event occurs.

Alternatively, the dart game apparatus may further include a network connection unit for communication with a dart game server through a network and in addition, the individual specialized multimedia information acquisition unit may acquire the individual specialized multimedia information included in the player information from the dart game server.

Alternatively, the dart game apparatus may further include a camera unit including a photographing module disposed to photograph at least a part of a dart game player and in addition, the individual specialized multimedia information acquisition unit may acquire the individual specialized multimedia information of the player from the camera unit.

Alternatively, the output unit may output individual specialized multimedia derivation information generated in order to acquire the individual specialized multimedia information of the player and the individual specialized multimedia information acquisition unit may acquire the individual specialized multimedia information of the player at least partially based on a player input corresponding to the individual specialized multimedia derivation information.

Alternatively, the individual specialized multimedia information acquisition unit may acquire the individual specialized multimedia information of the player from a player device.

Alternatively, the individual specialized multimedia information acquisition unit may transmit/receive information to/from the player device of the player connected by the short-range module including at least one of Bluetooth, radio frequency identification (RFID), infrared data association (IrDA), ultra wideband (UWB), ZigBee, near field communication (NFC), and Beacon to acquire the individual specialized multimedia information of the player.

Alternatively, the individual specialized multimedia information verification unit may additionally verify whether the player information acquired from at least one of the player input unit and the player identification means and player information prestored to correspond to the player are the same as each other and when the acquired player information and the prestored player information are the same as each other, the individual specialized multimedia information verification unit may search the individual specialized multimedia information of the player, which is stored in the memory to correspond to the player information.

Alternatively, the player identification means may include at least one of a smart card and the dart pin and may be coupled with a player identification module including one of an NEC module, an RFID module, and a microchip. Alternatively, the individual specialized multimedia information may be stored in at least one of the player information and the memory at least based on a player input of the player.

Alternatively, the predetermined event may include at least one of an event of receiving the player input, a dart game start approval event for allowing the player to play the dart game in the dart game apparatus, an event of acquiring the player information, an event at least partially based on a predetermined score, a direct-hit event of the dart pin, a change event of the dart game player, a decision event of a dart game match, a dart game end event, a player matching event, and a reward decision event for providing the reward.

Another exemplary embodiment of the present disclosure provides a computer program stored in a computer-readable storage medium including encoded commands. The computer program may allow one or more processors to perform the following operations when the computer program is executed by one or more processor of a computer system and the operations may include: an operation of sensing a hit location of a dart pin thrown to a dart target capable of accommodating the thrown dart pin; an operation of receiving a player input; an operation of acquiring player information from at least one of a player input unit and a player identification means; an operation of verifying whether individual specialized multimedia information of the player is stored in a memory; an operation of acquiring the individual specialized multimedia information of the player when the individual specialized multimedia information of the player is not stored in the memory; and an operation of outputting the individual specialized multimedia information of the player when a predetermined event occurs.

Yet another exemplary embodiment of the present disclosure provides a dart game apparatus including: a dart target capable of accommodating a thrown dart pin; a sensing unit sensing a hit location of a thrown dart pin; a controller determining score information depending on each of one or more dart pins thrown by a first player based on information on the hit location, which is received from the sensing unit, determining the determined respective score information of the first player to be output in response to throwing of the respective dart pins, permitting a second player to throw the dart pins when it is sensed that a round of the first player ends, determining the score information depending on each of one or more dart pins thrown by the second player, comparing the determined respective score information of the second player with current score information of the first player, and determining whether the current score information depending on throwing of the dart pins of the second player is output in association with comparison result information based on a result of the comparison; and an output unit outputting the score information depending on the throwing of the dart pins and the result information of the comparison according to the control by the controller.

Still yet another exemplary embodiment of the present disclosure provides a computer program stored in a computer-readable storage medium including encoded commands. The computer program allows one or more processors to perform the following operations when the computer program is executed by one or more processors of a computer system and the operations may include: an operation of sensing a hit location of a dart pin thrown to a dart target capable of accommodating the thrown dart pin; an operation of determining score information depending on each of one or more dart pins thrown by a first player based on the information on the hit location; an operation of determining the determined respective score information of the first player to be output in response to throwing of the respective dart pins; an operation of permitting a second player to throw the dart pins when it is sensed that a round of the first player ends; an operation of determining the score information depending on each of one or more dart pins thrown by the second player; an operation of comparing the determined respective score information of the second player with current score information of the first player; and an operation of determining whether the current score information depending on throwing of the dart pins of the second player is output in association with comparison result information based on a result of the comparison.

A further exemplary embodiment of the present disclosure provides a dart game method performed by a dart game apparatus, The method may include: sensing a hit location of a dart pin thrown to a dart target capable of accommodating the thrown dart pin; determining score information depending on each of one or more dart pins thrown by a first player based on the information on the hit location; determining the determined respective score information of the first player to be output in response to throwing of the respective dart pins; permitting a second player to throw the dart pins when it is sensed that a round of the first player ends; determining the score information depending on each of one or more dart pins thrown by the second player; comparing the determined respective score information of the second player with current score information of the first player; and determining whether the current score information depending on throwing of the dart pins of the second player is output in association with comparison result information based on a result of the comparison.

Another further exemplary embodiment of the present disclosure provides another dart game apparatus. The dart game apparatus may include: a dart target capable of accommodating a thrown dart pin; a sensing unit sensing a hit location of a thrown dart pin; a controller determining score information of two or more players and comparing the score information of the two or more players, based on the hit location of the dart pin sensed by the sensing unit; and a display unit including a first area displaying the score information of a first player among the two or more players and a second area displaying the score information of a second player among the two or more players and outputting an event effect determined based on a result of comparing the score information with each other.

According to exemplary embodiments of the present disclosure, an entertainment element of a dart game can be increased.

BRIEF DESCRIPTION OF THE DRAWINGS

Various aspects are now described with reference to the drawings and like reference numerals are generally used to designate like elements. In the following embodiments, for description, multiple specific detailed matters are presented to provide general understanding of one or more aspects. However, it will be apparent that the aspect(s) can be executed without the detailed matters. In other examples, known structures and apparatuses are illustrated in a block diagram form in order to facilitate description of the one or more aspects.

DETAILED DESCRIPTION

Figure 1:
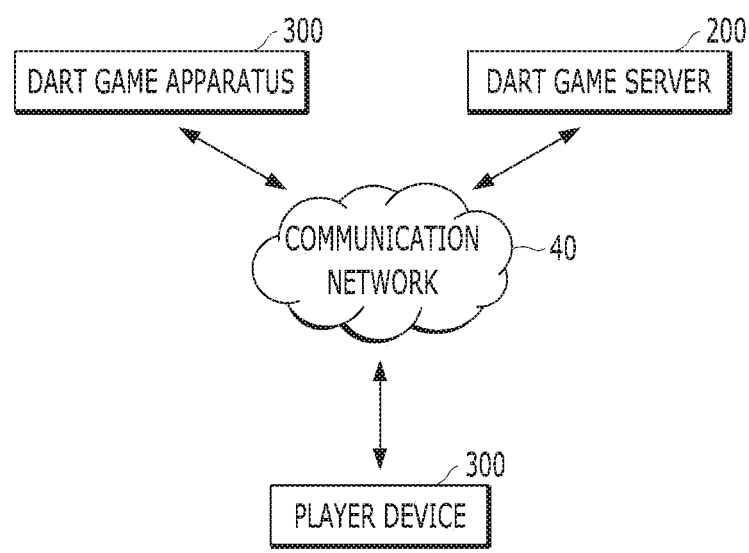
FIG. 1 is a conceptual diagram illustrating a dart game system according to exemplary embodiments of the present disclosure.

Various exemplary embodiments will be now described with reference to drawings. In the present specification, various descriptions are presented to provide appreciation of the present disclosure. However, it is apparent that the exemplary embodiments can be executed without the specific description. In other examples, known structures and apparatuses are presented in a block diagram form in order to facilitate description of the exemplary embodiments.

Terms "component", "module", "system", and the like used in the specification designate a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside in the processor and/or execution thread and one component may be localized in one computer or distributed among two or more computers. Further, the components may be executed by various computer-readable media having various data structures, which are stored therein. The components may perform communication through local and/or remote processing according to a signal (for example, data transmitted to another system from one component that interacts with other components through a network such as the Internet in a local system and a distribution system) having one or more data packets, for example.

It should be appreciated that the word "comprises" and/or "comprising" means that the corresponding feature and/or component is present, but presence or inclusion of one or more other features, components, and/or a group thereof is not excluded. Further, when not separately specified or not clear in terms of the context by indicating a singular form, it should be construed that the singular form generally means "one or more" in the present specification and the claims.

The terms "information" and "data" used in the specification may also be often used to be exchanged with each other.

The objects and effects of the present disclosure, and technical components of accomplishing these will become obvious with reference to embodiments to be described below in detail along with the accompanying drawings. In describing the present disclosure, a detailed description of known function or constitutions will be omitted if it is determined that it unnecessarily makes the gist of the present disclosure unclear. In addition, terms to be described below as terms which are defined in consideration of functions in the present disclosure may vary depending on the intention or usual practice of a user or an operator.

However, the present disclosure is not limited to exemplary embodiments disclosed below but may be implemented in various different forms. However, the exemplary embodiments are provided to make the present disclosure be complete and completely announce the scope of the present disclosure to those skilled in the art to which the present disclosure belongs and the present disclosure is just defined by the scope of the claims. Accordingly, the terms need to be defined based on contents throughout this specification.

FIG. 1 is a conceptual diagram illustrating a dart game system according to exemplary embodiments of the present disclosure.

According to the exemplary embodiments of the present disclosure, a dart game system that provides individual specialized multimedia information to a player may include a dart game apparatus 100, a dart game server 200, and a player device 300. The dart game apparatus 100, the dart game server 200, and/or the player device 300 according to the exemplary embodiments of the present disclosure may be connected through a communication network 40. Data may be transmitted/received among components connected to the communication network 40 through the communication network 40.

Herein, the communication network 40 may include wireless LAN (WLAN), Wi-Fi, wireless broadband (Wibro), world interoperability for microwave access (Wimax), high speed downlink packet access (HSDPA), IEEE 802.16, long term evolution (LTE), wireless mobile broadband service (WMBS), and the like. According to the exemplary embodiments of the present disclosure, a short-range communication technology may include Bluetooth, radio frequency identification (RFID), infrared data association (IrDA), ultra wideband (UWB), ZigBee, near field communication (NFC), and the like. A wired communication technology according to the exemplary embodiments of the present disclosure may include USB communication, Ethernet, serial communication, optical/coaxial cable, and the like. The aforementioned disclosures are exemplary disclosures according to the exemplary embodiments of the present disclosure and it may be apparently appreciated by those skilled in the art that the scope of the present disclosure is not limited thereto.

In the exemplary embodiments of the present disclosure, the dart game apparatus 100 may provide the individual specialized multimedia information to the player. To this end, the dart game apparatus 100 is connected with the dart game server 200 through the communication network 40 to transmit/receive various information for providing the individual specialized multimedia information according to the exemplary embodiment of the present disclosure.

The "individual specialized multimedia information" which is a term used in the present specification may include audio information and/or video information which may be set in a customized manner differently for each individual or player. According to the exemplary embodiments of the present disclosure, when a predetermined event (for example, a case where a hit location of a dart pin is double bull, a case where an overtaking or a tie occurs, etc.) occurs, the individual specialized multimedia information may be output. The individual specialized multimedia information may be stored in the player information and at least one of the dart game apparatus 100 and/or the dart game server 200 at least based on a player input of the player. Further, the individual specialized multimedia information may be information which is prestored in the dart game apparatus or the dart game server.

In more detail, when the player information is acquired from at least one of a player input unit and a player identification means in the dart game apparatus 100, it is verified whether the individual specialized multimedia information of the player is stored in a memory. When the individual specialized multimedia information of the player is not stored in the memory, the dart game apparatus 100 may acquire the individual specialized multimedia information of the player from the dart game server 200 and/or the player device 300 connected with the dart game apparatus 100 through the communication network 40. According to other exemplary embodiments, the individual specialized multimedia information may be acquired by a camera unit of the dart game apparatus 100. This will be described below.

In the exemplary embodiments of the present disclosure, the player device 300 may include a cellular phone, a tablet, a PC, a notebook, a PMP, and an MP3 player. Within a purpose scope of the present disclosure, the player device 300 may include various types of terminals which may transmit/receive information to/from the dart game apparatus 100 and/or the dart game server 200 according to the exemplary embodiments of the present disclosure.

According to the exemplary embodiments of the present disclosure, when the individual specialized multimedia information of the player is not stored in the dart game apparatus 100 and/or the dart game server 200, derivation information for causing the player to receive the individual specialized multimedia information may be presented to the dart game apparatus 100 and/or the player device 300.

Although not illustrated in the drawings, the dart game server 200 according to the exemplary embodiments of the present disclosure may be integrally provided in the dart game apparatus 100. The dart game server 200 may be installed inside the dart game apparatus 100. For example, a dart game system operator may select any one of a plurality of dart game apparatuses and set the selected dart game apparatus as a main dart game apparatus. One or more dart game apparatuses other than the main dart game apparatus are constituted by one or more sub dart game apparatuses to install the dart game server 200 inside the main dart game apparatus. According to the exemplary embodiments of the present disclosure, the main dart game apparatus may be connected with the dart game server installed inside the main dart game apparatus through the communication network 40. Further, the main dart game apparatus and one or more sub dart game apparatuses may be connected to each other through the communication network 40.

The aforementioned disclosure is just exemplary and the dart game server 200 according to the exemplary embodiments of the present disclosure is positioned outside the dart game apparatus 100 to communicate with other dart game apparatuses.

Contents illustrated in FIG. 1 are exemplary figures for describing a method for providing individual specialized multimedia information according to the exemplary embodiments of the present disclosure and the present disclosure is not limited thereto.

Figure 2:
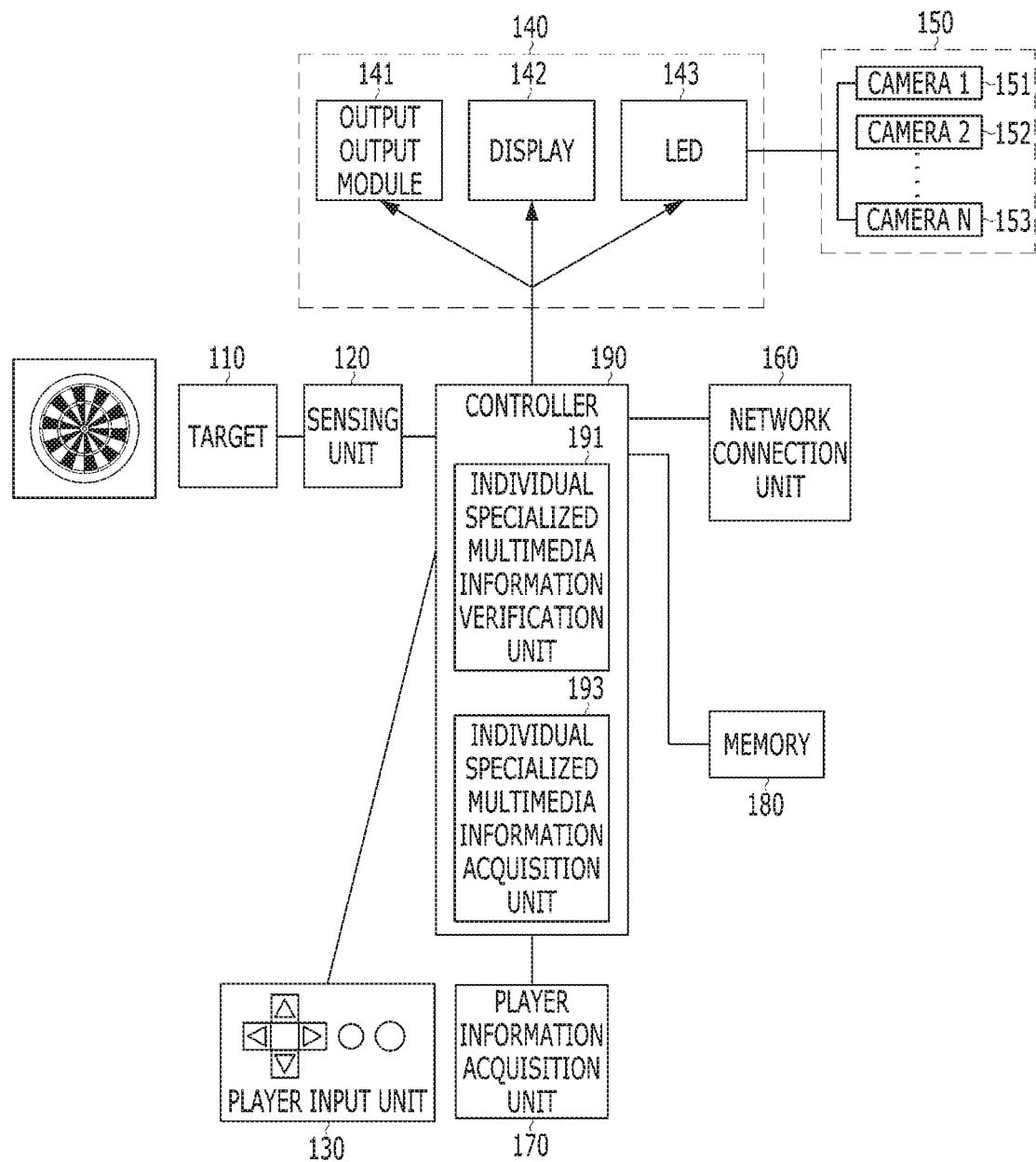
FIG. 2 is a block diagram of a dart game apparatus according to the exemplary embodiments of the present disclosure.

FIG. 2 is a block diagram of a dart game apparatus according to the exemplary embodiments of the present disclosure.

The dart game apparatus 100 according to the exemplary embodiments of the present disclosure may include a target 110, a sensing unit 120, a player input unit 130, an output unit 140, a camera unit 150, a network connection unit 160, a player information acquisition unit 170, a memory 180, a controller 190, and the like. The components illustrated in FIG. 2 are not required. Therefore, the dart game apparatus 100 having more components therethan or less components therethan may be implemented.

Terms "dart target 110", "dart board 110", "dart board 110", "dart mark 110", and "target 110" used in the present specification may often be used to be exchanged with each other.

Hereinafter, the components will be described in sequence.

In the target 110 according to the exemplary embodiments of the present disclosure, scores are classified for each section according to a rule of a game corresponding to the dart game apparatus to score the play of a game participant. For example, when the game corresponding to the dart game apparatus is a dart game, the target 110 may mean a score board in which a bullseye is positioned at the center and there are areas segmented by a concentric circle centering the bullseye and straight lines extended radially from the bullseye and granted with individual scores, respectively. Multiple holes into which a tip of a dart may be inserted may be formed on the score board.

In an additional exemplary embodiment, the target 110 may include a display 142 to be described below. Therefore, shapes of areas at which the scores are arranged and to which the scores are granted in the target 110 may be variably changed. In this case, the target 110 includes a light transmissive touch pad to be stacked in the display 142 to take a form of a touch screen.

The sensing unit 120 may sense the play of a dart game player performed with respect to the dart target 110. The sensing unit 120 may sense a hit location of a dart pin so as to actually evaluate the play of the game player. The sensing unit 120 may sense which area of the dart target 110 a thrown dart hits, with respect to a play in which the game player throws the dart. The sensing unit 120 electrically converts a score corresponding to the area which the dart hits to transmit the converted score to the control module 190.

The player input unit 130 receives an input of a user for controlling the dart game apparatus 100. The player input unit 130 may include a keypad, a dome switch, a touch pad (resistive/capacitive), a jog wheel, a jog switch, and the like. The player input unit 130 may also include cameras 151 to 153, a microphone, or the like.

The user may select a game mode, the number of game participants, a game play mode, and the like through the player input unit 130. For example, in the case of the dart game, the user may select the number of players, the game play mode (a zero one game, a cricket game, and the like), and the game mode (a single play, a network play, and the like) through the player input unit 130.

The player input unit 130 receives a signal by sensing a key operation or a touch input of the user or receives speech or a motion through cameras 151 to 153 or a microphone of the user to convert the received signal, speech, or motion into an input signal. To this end, a known speech recognition technology or a motion recognition technology may be used.

According to the exemplary embodiments of the present disclosure, the output unit 140 which is used for generating an output related with sight, hearing, or touch may include a sound output module 141, the display 142, an illumination unit 143, and the like. For example, the output unit 140 may output score information by throwing the dart pin and result information of the comparison according to the control by the controller.

The sound output module 141 may output audio data received from the network connection unit 160 or stored in the memory 180 in a game sound effect, a game motion guide, a game method description, and the like. The sound output module 141 may also output a sound signal related with a function (e.g., a game effect sound) performed by the dart game apparatus 100. The sound output module 141 may also output a speech of a game player or a third person using another dart game apparatus 200 (see FIG. 2), which is received through the network connection unit 160. The sound output module 141 may include a receiver, a speaker, a buzzer, and the like.

The display 142 displays (outputs) information processed in the dart game apparatus 100. For example, when the dart game apparatus 100 is in a game play mode guidance mode, the display 142 may output a selectable game play mode. When the dart game apparatus 100 is playing a game, the display 142 may display the score sensed through the sensing unit 120 or output an image acquired by photographing the game player or the third person using another dart game apparatus received through the network connection unit 160.

The display 142 may display the individual specialized multimedia information (for example, sound and/or video) of the player according to the exemplary embodiments of the present disclosure. The individual specialized multimedia information according to the exemplary embodiments of the present disclosure may be multimedia information directly photographed by the player. As another example, the individual specialized multimedia information may be multimedia information selected from the player among a plurality of multimedia information which is generated in advance. When the player selects a predetermined number of multimedia information among the plurality of multimedia information which is generated in advance, the individual specialized multimedia information of the player may be generated through additional editions (an effect sound, a video effect, text insertion, and the like) of the selected multimedia. The individual specialized multimedia information may be stored in at least one of the player information and the memory at least based on a player input of the player.

According to the exemplary embodiments of the present disclosure, the individual specialized multimedia information may include a bonus zone of the dart target, a character image of the player, information on a character of the player, an image associated with a reward provided to the character of the player, an image based on dart game data, and an image associated with an event on a game which may be executed in the mobile terminal. For example, the individual specialized multimedia information may include an image in which the character selected by the player appears and cries double bull.

The individual specialized multimedia information according to the exemplary embodiments of the present disclosure may be set to a time range (e.g., between 0.8 seconds and 1.2 seconds) which does not exert a large influence on a progress time of the dart game. Alternatively, a display time of the individual specialized multimedia information in the display unit 142 may be set to a time range (e.g., between 0.8 seconds and 1.2 seconds) which does not exert a large influence on the progress time of the dart game.

The individual specialized multimedia information may be displayed in the display 142 when the predetermined event occurs. Herein, the predetermined event may include at least one of an event of receiving the player input, a dart game start approval event for allowing the player to play the dart game in the dart game apparatus, an event of acquiring the player information, an event at least partially based on a predetermined score, a direct-hit event of the dart pin, a change event of the dart game player, a decision event of a dart game match, a dart game end event, an overtaking event, a tie event, a player matching event, and a reward decision event for providing the reward and the scope of the present disclosure is not limited thereto. For example, the player may decide an event which is determined in advance (e.g., before the dart game starts). For example, the player may define a case where the dart pin thrown by the player hits a triple 14 area as the predetermined event. Alternatively, the player may define a case where a counterpart player performing the dart game together misses the dart pin as the predetermined event. As described above, a scheme in which the player decides the predetermined event may be the same as a scheme in which the player inputs the individual specialized multimedia information. Additionally, as described above, the predetermined event decided by the player may be stored and/or managed together with the individual specialized multimedia information of the player. The individual specialized multimedia information according to the exemplary embodiments of the present disclosure may be displayed in the display 142 simultaneously when the dart pin thrown from the player reaches the dart target 110. As another example, after the dart pin reaches the dart target 110, the individual specialized multimedia information may be displayed in the display 142 after a predetermined time elapsed.

The individual specialized multimedia information according to the exemplary embodiments of the present disclosure may be displayed in the display 142 when the player input is received from the player. Alternatively, when the player information is acquired from at least one of the player input unit and the player identification means, the individual specialized multimedia information may be displayed in the display 142. In more detail, when the player identification means (e.g., the smart card) of the player contacts the dart game apparatus 100 and the player information regarding the player is acquired from the player identification means, the individual specialized multimedia information of the player may be displayed in the display 142. As another example, when the player identification means (e.g., the dart pin) of the player contacts the dart game apparatus 100 and the player information regarding the player is acquired from the player identification means, the individual specialized multimedia information of the player may be displayed in the display 142.

The individual specialized multimedia information may be configured by information which is different for each predetermined event. For example, in the case where the hit location of the dart pin thrown by the player corresponds to the triple area and in the case where the hit location of the dart pin thrown by the player corresponds to the double area, different individual specialized multimedia information may be displayed in the display 142. Further, a display time of the individual specialized multimedia information may also be set differently according to a type of the event. In addition, the dart game apparatus 100 may display the different individual specialized multimedia information in the case of receiving the dart game start approval information and the case where the player is decided to receive the predetermined reward.

The individual specialized multimedia information according to the exemplary embodiments of the present disclosure may include some of images (e.g., an image acquired by photographing the dart game player, an image acquired by photographing the dart pin thrown by the dart game player, and the like) associated with the dart game play of the dart game player. The images may be decided based on the input (e.g., a selective input of a predetermined image among a plurality of images) from the dart game player.

An edition layout may be provided so as to edit the individual specialized multimedia information according to a taste of the dart game player. The edition layout may be output from the display 142 of the dart game apparatus 100. As another example, the edition layout may operate according to the user input inputted in the player input unit 130.

According to the exemplary embodiments of the present disclosure, the output unit 140 may output the individual specialized multimedia derivation information generated to acquire the individual specialized multimedia information of the player. For example, the display 142 may display guidance information for causing the player to generate the individual specialized multimedia information and in addition, the sound output module 141 may output the guidance information for causing the player to generate the individual specialized multimedia information.

The individual specialized multimedia derivation information according to the exemplary embodiments of the present disclosure may include at least one of information for causing the player to announce that the individual specialized multimedia information does not exist and information for generating the individual specialized multimedia information and this does not limit the right scope of the present disclosure.

For example, the individual specialized multimedia derivation information according to the exemplary embodiments of the present disclosure may present the type of the character which may be selected by the player in order to generate the individual specialized multimedia information and include information for receiving the input of the player for the presented type. Further, the individual specialized multimedia derivation information according to the exemplary embodiments of the present disclosure may present guidance information regarding an operation of the camera unit in order to receive the individual specialized multimedia information of the player. For example, guidance information regarding what seconds later the camera unit will photograph the player may be one example of the individual specialized multimedia derivation information. Further, information for presenting the player to take a predetermined pose during the operation of the camera unit may be another example of the individual specialized multimedia derivation information.

The display 142 according to the exemplary embodiments of the present disclosure may include at least one of a liquid crystal display (LCD), a thin film transistor-liquid crystal display (TFT LCD), an organic light-emitting diode (OLED), a flexible display, and a 3D display. Some of the displays may be configured as a transparent or light transmissive type to view the outside through the displays. This may be called a transparent display and a representative example of the transparent display includes a transparent OLED (TOLED), and the like.

According to an implementation form of the dart game apparatus 100, two or more displays 142 may exist. For example, in the dart game apparatus 100, the plurality of displays may be separated from each other or integrally disposed on one surface, and further, disposed on different surfaces, respectively. For example, in the dart game apparatus 100, the plurality of displays may be separated from each other or integrally disposed on one surface, and further, disposed on different surfaces, respectively. For example, the display 142 may include both a display 142 disposed at an upper end of the target 110 and a display disposed at a lower end of the target 110, or may include one display 142 thereof. However, a location where the aforementioned displays are disposed is an example, and the display may be disposed at various locations for a demand for a need of a design or a visual effect.

The touch sensor may be configured to convert a change in pressure applied to a specific portion of the display 142 or capacitance generated at the specific portion of the display 142 into an electrical input signal. The touch sensor may be configured to detect touch pressure as well as a touched position and area. When there is a touch input for the touch sensor, a signal(s) corresponding to the touch input is(are) sent to a touch controller. The touch controller processes the signal(s) and thereafter, transmits data corresponding thereto to the controller 190. As a result, the controller 190 may know which area of the display 142 is touched.

The illumination unit 143 according to the exemplary embodiments of the present disclosure outputs a signal for notifying occurrence of an event of the dart game apparatus 100. Examples of the event which occurs in the dart game apparatus 100 may include direct hit of the dart, a change of the dart game participant, a determination of the dart game victory or defeat, game over, and the like in the case of the dart game. The illumination unit 143 may also output another form other than a video signal or an audio signal, for example, a signal for notifying the occurrence of the event by vibration. The illumination unit 143 may include a light emission diode (LED) and notify the occurrence of the event to the user through flickering of the LED. The LEDs are disposed on the bottom of the dart target 110 to be flickered according to a flickering pattern which is pre-stored according to the occurrence of the event. For example, one or more LEDs may be allocated to respective parts of the dart target 110. The allocated LEDs are disposed on the bottom of the dart target 110 and may be disposed in a direction orienting the outside of the dart game apparatus 100. When the LEDs irradiate light, the light irradiated by the LEDs may pass through the dart target 110 made of a transparent or translucent material to transfer a visual output to the user. Alternatively, the light irradiated by the LEDs may transfer the visual output to the user through a gap existing in the dart target 110. The individual specialized multimedia information according to the exemplary embodiments of the present disclosure may additionally include information for controlling the illumination unit 143. The illumination unit 143 may turn on a predetermined illumination when the overtaking occurs. Therefore, a maximized entertainment element may be provided to the dart game players.

The output unit 140 may also output another form other than a video signal or an audio signal, for example, a signal for notifying the occurrence of the event by vibration.

The camera unit 150 according to the exemplary embodiments of the present disclosure includes multiple cameras 151 to 153, and as a result, an image frame processed by the cameras 151 to 153 may be stored in the memory 180 or transmitted to the outside through the network connection unit 160. The camera unit 150 may be constituted by one camera or constituted by two or more cameras according to a use environment.

In the exemplary embodiments of the present disclosure, the camera unit 150 may be disposed to photograph two or more points on a movement route of the dart pin. In one aspect of the present disclosure, the camera unit 150 may include a plurality of cameras and the respective cameras may be disposed to photograph point(s) corresponding thereto, respectively. When the plurality of cameras exists, the speed of the dart pin may be measured by using the plurality of cameras. The information on the measured speed may be transferred to the controller 190 or the memory 180.

In the exemplary embodiments of the present disclosure, t least some cameras of the camera unit 150 may be disposed to photograph an image frame including the dart target 110 and other cameras may be disposed to photograph an image frame directly related with a game rule in the dart game play. For example, the camera may be disposed to photograph a throw-line on which the dart is thrown in order to photograph the image frame directly related with the dart game rule. The multiple cameras 150 to 153 included in the camera unit 153 may be disposed to photograph at least some image frames to overlap with each other. In the exemplary embodiment of the present disclosure, when the camera unit 150 includes one camera, the camera may be a panoramic camera disposed to photograph both at least a part of the dart target 110 and the image frame (e.g., the throw-line in the dart game) directly related with the game rule.

In the exemplary embodiments of the present disclosure, the camera unit 150 may be disposed to photograph a part of the throw line and/or the player together with two or more points on the movement route of the dart pin. Alternatively, the camera unit 150 may be disposed to photograph at least a part of the dart target 110 together with two or more points on the movement route of the dart pin. The camera unit 150 may perform the above-described photographing through one camera or may perform the above-described photographing through a plurality of cameras.

The number, arrangement, and angle directions of cameras in the dart game apparatus 100 may be changed based on the dart game mode, the characteristics and size of the dart game apparatus, user setting, and user information. For example, only one camera may be disposed to photograph all moving areas of the dart pin. When the camera unit 150 includes one camera, the camera may be a panoramic camera disposed to photograph both at least a part of the dart target 110 and the image frame (e.g., the throw-line in the dart game) directly related with the game rule.

In the exemplary embodiments of the present disclosure, the camera unit 150 may be disposed to photograph at least a part of the dart game player who uses the dart game apparatus 100. In more detail, at least a part of the player, which is photographed by the camera unit 150 may be used as the individual specialized multimedia information according to the exemplary embodiments of the present disclosure. Therefore, the play image of the dart game player, which is photographed by the camera unit 150 and/or the image photographed to be used as the individual specialized multimedia information may be set as the individual specialized multimedia information. Accordingly, the dart game apparatus 100 may maximize the entertainment side of the dart game by efficiently using one or more cameras. Additionally, the image photographed by the camera unit 150 may be output while being transferred to the output unit by the control by the controller for the time when the overtaking or the tie occurs.

The network connection unit 160 may include one or more modules that enable wireless communication between the dart game apparatus 100 and a wired/wireless communication system or between the dart game apparatus 100 and a network on which the dart game apparatus 100 is positioned.

The network connection unit 160 may include a wired/wireless Internet module for accessing the network. As the wireless Internet technology, wireless LAN (WLAN) (Wi-Fi), wireless broadband (Wibro), world interoperability for microwave access (Wimax), high speed downlink packet access (HSDPA), or the like, may be used. As wired Internet technology, digital subscriber line (XDSL), fibers to the home (FTTH), power line communication (PLC), or the like may be used.

The network connection unit 160 includes a short-range communication module to transmit and receive data to and from an electronic apparatus positioned in a comparatively short range from the dart game apparatus 100 and including the short-range communication module. As short range communication technology, Bluetooth, radio frequency identification (RFID), infrared data association (IrDA), ultra wideband (UWB), ZigBee, or the like may be used.

The network connection unit 160 may sense a connection state of the network and a transceiving speed of the network.

Data received through the network connection unit 160 may be output through the output unit 140, stored through the memory 180, or transmitted to other electronic apparatuses positioned in a short range through the short-range communication module. The player information acquisition unit 170 recognizes unique information of a long-range user by using a radio wave through the radio frequency identification (RFID) technology which is a kind of the short range communication technology. For example, the user may possess a card, a mobile terminal, or unique game equipment (for example, his/her own personal dart equipment (for example, the dart pin)), which includes an RFD module. Information (e.g., a personal ID, an identification code, and the like of the user registered in the database server (DB) (see FIG. 2)) for identifying the user may be recorded in the RFID module possessed by the user. The dart game apparatus 100 identifies the RFID module possessed by the user to identify the dart game participant which plays the game by using the dart game apparatus 100 and update a database for the identified dart game participant or accumulate new data. In the exemplary embodiments of the present disclosure, the player information acquisition unit 170 may be integrated in the player input unit 130.

The player information acquisition unit 170 may include various technologies (e.g., the short-range communication technology such as the Bluetooth, and the like) that may transmit and receive unique information of the user by a contact/non-contact method in addition to the RFID technology. Further, the player information acquisition unit 170 may include a biodata identification module that identifies biodata (speech, a fingerprint, and a face) of the user by interworking with the microphone of the player input unit 130, the touch pad, the camera unit 150, and the like.

According to the exemplary embodiments of the present disclosure, the player information acquisition unit 170 may recognize the player based on at least one of an email account, an SNS account, a mobile messenger account, an ID of the player, and the identification information of the player.

The memory 180 according to the exemplary embodiments of the present disclosure may store a program for a motion of the controller 190 therein and temporarily store input/output data (e.g., a phone book, a message, a still image, a moving picture, or the like) therein. The memory 180 may store data regarding various patterns of vibrations and sounds output in the touch input on the touch screen.

The memory 180 according to the exemplary embodiments of the present disclosure may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The dart game apparatus 100 may operate in connection with a web storage performing a storing function of the memory 180 on the Internet.

In the exemplary embodiments of the present disclosure, the memory 180 may store the individual specialized multimedia information of the player. The individual specialized multimedia information may be stored to correspond to the player information.

In the exemplary embodiments of the present disclosure, the memory 180 may preset and store event information for outputting the individual specialized multimedia information. An event for outputting the individual specialized multimedia information may be determined from the player and/or an operator of the dart game apparatus 100 and arbitrarily set by the dart game server 200. The aforementioned disclosures are exemplary disclosures according to the exemplary embodiments of the present disclosure and the scope of the present disclosure is not limited thereto.

In the exemplary embodiments of the present disclosure, the memory 180 may store at least some of photographed data acquired by photographing at least two points on the movement route of the dart pin. In addition, the memory 180 may store the user information or identification information of the dart pin according to a user identification module coupled to the dart pin. In addition, the memory 180 may delete photographed data which is not loaded by another component or another device such as the controller 190, and the like from the stored photographed data after a predetermined time.

In the exemplary embodiment of the present disclosure, the information which may be stored in the memory 180 may include a record for each user's personal recording contest/tinge/place/game type, a game record for each dart pin of the user, a game record (when a separate recognition means and a separate recognition number are granted to a pin and a barrel) for each pin-barrel combination of the user, speed/game record information for each used dart pin of the user, and the like.

Hereinafter, a representative rule of a dart game and stats of the player associated therewith will be described.

The dart game which may be executed by the dart game apparatus 100 according to the exemplary embodiments of the present disclosure may include a 01 game (zero-one game), a cricket game, a count-up game, a match-up mode, and the like.

The 01 game is performed by two teams (alternatively, two players)' throwing the dart to the dart target alternately one by one round. One round includes three dart throwing motions. An object of the game is that sum-up of scores in each round reaches a target score (a score of the unit of 100 or 1000 that generally ends with 01 point, such as 301, 501, 701, 901, 1101, 1501 points, and the like). The target score and a play round may be arbitrarily adjusted according to the number of players that participate in the round.

In the cricket game, the round is performed by throwing three darts in a first round similarly to the 01 game. The standard cricket game may be performed by using only a bull region at the center of the dart target, and 20, 19, 18, 17, 16, and 15 point regions. When the corresponding cricket figures are hit with 3 marks, this is marked as a location of the player and when the corresponding cricket figures are hit with 4 marks or more, scores corresponding to the figures are added up to compete the scores. Herein, double regions and triple regions of the dart target may be calculated with 2 marks and 3 marks, respectively. While the corresponding cricket figure is marked as the location of the player, when a counterpart of the player also marks 3 as cricket figure, the corresponding cricket figure is regarded to be closed and no score may be added any longer. The object of the game may be set to acquire a high score until a regulation round ends or close all cricket figures and obtain a higher score than the counterpart.

The count-up game is a game at which the player wins when acquiring a high score within a predetermined round.

In addition to the aforementioned games, various types of games may be played by the dart game apparatus 100 and the play mode of the dart game apparatus 100 is not limited by the aforementioned game schemes. For example, by measuring the speed of a dart pin and utilizing the measured speed, a variety of additional game modes may be created. As one example, a game mode may be created, in which an additional point is provided to a user who throws the dart pin at a speed value that best matches a predetermined speed value. Alternatively, in addition to the above-described general game mode, after calculating the average speeds of the dart pins of famous dart game players and storing the calculated average speeds in advance, data acquired by comparing the average speed of the dart pin of the general player with the speed of a specific player among the famous players is output to further strengthen the entertainment aspect of the dart game.

In the exemplary embodiments of the present disclosure, the stats of the player may be defined according to the corresponding game rule independently from the winning or losing of the count-up game, the cricket game, and the 01 game.

For example, points per dart (PPD) may be calculated by dividing a total score which the player earns by the number of dart throwing times in the 01 game. Alternatively, marks per round (MPR) may be calculated by calculating the number of marking times of the player in one round. For example, in the cricket game, when the player performs three dart throwing motions in one round and the darts hit 15 triple, 19 single, and 20 double in the three dart throwing motions, respectively, the MPR becomes $(3+1+2)/1=6.00$ (MPR). In a subsequent round, when the player performs three dart throwing motions and the darts hit mark fail, 18 double, and 20 single in the three dart throwing motions, the MPR becomes (3+1+2+0+2+1)/2=4.5 (MPR).

The PPD and the MPR as the stats of the player may also be stored as personal data or identification data of the player. Alternatively, in the count-up game, an average score of the player per game, a highest score record of the player per game, and the like may be stored as the stats of the player.

The dart game apparatus 100 may play the dart game according to the corresponding mode and transmit a game record per player to the dart game server 200 and/or the player device 300. The game server 200 according to the exemplary embodiments of the present disclosure may calculate the PPD and/or MPR for each player according to the corresponding game record and store the calculated PPD and/or MPR as accumulated PPD and/or MPR stats of the player. Further, the dart game server 200 according to the exemplary embodiments of the present disclosure may individually store the game record of the player. For example, in the 01 game, the count-up game, or the cricket game which the player played in the past, the player may record information on a segment part of a dart which the player hits by each dart throw. The game server GS or DB server DB may store accumulated (average) PPD and/or MPR data and highest PPD and/or MPR data of the player. The game server 200 may store personal stats of the player and rating (alternatively, grade (class)) may be granted to the player according to the corresponding stats. The rating and/or grade (class) that may be granted to the player in accordance with the PPD and/or MPR may be stored as personal data or personal identification information.

The controller 190 generally controls all operations of the dart game apparatus 100. For example, in the case of the dart game, the score sensed through the sensing unit 120 is collected for each game participant, the collected score is transmitted to and received from another dart game apparatus 200 connected through the network, and a game winning/losing record, the score, and the like according to the collected result are recorded. The controller 190 may determine score information depending on each of one or more dart pins thrown by a first player based on the information on the hit location, which is received from the sensing unit, determine the determined respective score information of the first player to be output in response to throwing of the respective dart pins, permit a second player to throw the dart pins when it is sensed that a round of the first player ends, determine the score information depending on each of one or more dart pins thrown by the second player, compare the determined respective score information of the second player with current score information of the first player, and determine whether the current score information depending on throwing of the dart pins of the second player is output in association with comparison result information based on a result of the comparison. Herein, the score information may include at least one of point per dart (PPD) information, mark per round (MPR) information, score information corresponding to an area allocated to the dart target, and player level information. As another example, the score information includes score information which rises or falls depending on the throwing of the dart pin in the count-up game when the dart game played by the players is the count-up game and/or includes information regarding whether an area of the counterpart player is blocked depending on the throwing of the dart pin in the cricket game and the score information which rises depending on the throwing of the dart pin in the cricket game when the dart game played by the players is the cricket game. Further, the comparison result information may include multimedia information that represents the overtaking or the tie, which is prestored in the dart game apparatus. Further, in the comparison result information, image information or video information representing the overtaking, which is prestored in the dart game apparatus may include the individual specialized multimedia information of the player, which is received from the players and stored in the dart game apparatus. Further, the comparison result information may be output simultaneously with the score information of the second player and a location where the comparison result information is output may be associated with a location where the score information of the second player is output. The controller 190 may perform pattern recognition processing to recognize a motion input, a write input, and the like performed on the touch screen or camera as a text or an image. Further, the controller may perform speech recognition by using a speech-to-text (STT) function to recognize the speech input through the microphone as the text. In the exemplary embodiments of the present disclosure, the controller 190 may generate statistical data for each dart pin based on the data received by the user recognition unit of the dart game apparatus. Further, the controller 190 may determine providing an additional reward based on the data received by the user recognition unit of the dart game apparatus.

In the exemplary embodiments of the present disclosure, when the controller 190 senses that the capacity of the memory is exceeded, the controller 190 may allow the image to be deleted in the oldest image order among the photographed data stored in the memory 180. In addition, the controller 190 may control the memory 180 to delete the unloaded photographed data after a specific time period.

The controller 190 may determine the current score information depending on the current throwing of the dart pin of the second player to be output together with the comparison result information representing the overtaking when the current score information depending on the throwing of the dart pin of the second player is determined to overtake the current score information of the first player according to the result of comparing the determined respective score information of the second player with the current score information of the first player. The comparison result information may include the multimedia information representing the overtaking or the tie, which is prestored in the dart game apparatus and in the comparison result information, the image information or video information representing the overtaking, which is prestored in the dart game apparatus may include the individual specialized multimedia information the player, which is received from the players and stored in the dart game apparatus. Further, the comparison result information may be output simultaneously with the score information of the second player and the location where the comparison result information is output may be associated with the location where the score information of the second player is output.

The controller 190 may additionally determine the current score information depending on the throwing of the dart pin of the second player to be output together with the comparison result information representing the overtaking when the current score information depending on the current throwing of the dart pin of the second player is determined to overtake the current score information of the first player according to the comparison result.

The controller 190 determines the information on the round played by the current players and determines whether the determined round information corresponds to round information predetermined in the dart game apparatus to determine the current score information depending on the throwing of the dart pin of the second player to be output in association with the comparison result information only when the determined round information corresponds to the predetermined round information. In addition, the controller 190 may determine score information required for turning around the current score information of the first player to be output in association with the current score information depending on the throwing of the dart pin of the second player based on the current score information depending on the throwing of the dart pin of the second player. Further, the controller 190 may determine the current score information depending on the throwing of the dart pin of the second player to be output together with the comparison result information representing the tie when the current score information depending on the throwing of the dart pin of the second player is determined to be the same as the current score information of the first player according to the comparison result. The controller 190 additionally may determine the comparison result information representing the overtaking to be transmitted to a device of the first player or the device of the second player in real time when the current score information depending on the throwing of the dart pin of the second player is determined to overtake the current score information of the first player according to the comparison result.

As illustrated in FIG. 2, since the controller 190 may communicate with all of the above-mentioned other components, the controller 190 may organically control operations of the corresponding components.

The controller 190 according to the exemplary embodiments of the present disclosure may include an individual specialized multimedia information verification unit 191 and an individual specialized multimedia information acquisition unit 193.

In the exemplary embodiments of the present disclosure, the individual specialized multimedia information verification unit 191 may verify whether the individual specialized multimedia information of the player is stored in the memory. The individual specialized multimedia information verification unit 191 may additionally verify whether the player information acquired from at least one of the player input unit and the player identification unit and the player information prestored to correspond to the player are the same as each other and when the acquired player information (e.g., the player identification information) and the prestored player information (e.g., the player identification information) are the same as each other, the individual specialized multimedia information verification unit 191 may search the individual specialized multimedia information of the player, which is stored in the memory to correspond to the player information.

In the exemplary embodiments of the present disclosure, the individual specialized multimedia information acquisition unit 193 may perform operations for acquiring the individual specialized multimedia information of the player when the individual specialized multimedia information of the player is not stored in the memory.

The individual specialized multimedia information acquisition unit 193 may acquire the individual specialized multimedia information included in the player information from the dart game server. Alternatively, the individual specialized multimedia information acquisition unit 193 may acquire the individual specialized multimedia information of the player from the camera unit. Alternatively, the individual specialized multimedia information acquisition unit 193 may acquire the individual specialized multimedia information of the player at least partially based on the player input corresponding to the individual specialized multimedia derivation information.

In the exemplary embodiments of the present disclosure, the individual specialized multimedia information acquisition unit 193 may acquire the individual specialized multimedia information of the player from the player device.

Although not illustrated, the dart game apparatus 100 according to the exemplary embodiments of the present disclosure further includes a speed measurement unit to measure a speed of the dart pin during a predetermined interval or at a predetermined time in a period from a throwing time of the dart pin up to a reach time of the dart pin to a dart board. The dart game apparatus may measure the speed of the dart pin by using an optical sensor, a piezoelectric element, a camera and the like. Further, the speed of the dart pin may be measured by a method in which those skilled in the art may easily derive the speed of the dart pin in addition to the optical sensor, the piezoelectric element, the camera, and the like.

Various embodiments described herein may be implemented in a computer-readable recording medium or a recording medium readable by a device similar to the computer by using, for example, software, hardware, or a combination thereof.

According to hardware implementation, the embodiment described herein may be implemented by using at least one of the application specific integrated circuits (ASICs), the digital signal processors (DSPs), the digital signal processing devices (DSPDs), the programmable logic devices (PLDs), the field programmable gate arrays (FPGAs), the processors, the controllers, the micro-controllers, the microprocessors, and the electric units for performing other functions. In some cases, the embodiments described in the specification may be implemented by the controller 190 itself.

According to software implementation, embodiments such as a procedure and a function described in the specification may be implemented by separate software modules. Each of the software modules may perform one or more functions and operations described in the specification. A software code may be implemented by a software application written by an appropriate program language. The software code may be stored in the memory 180 and executed by the controller 190.

Figure 3:
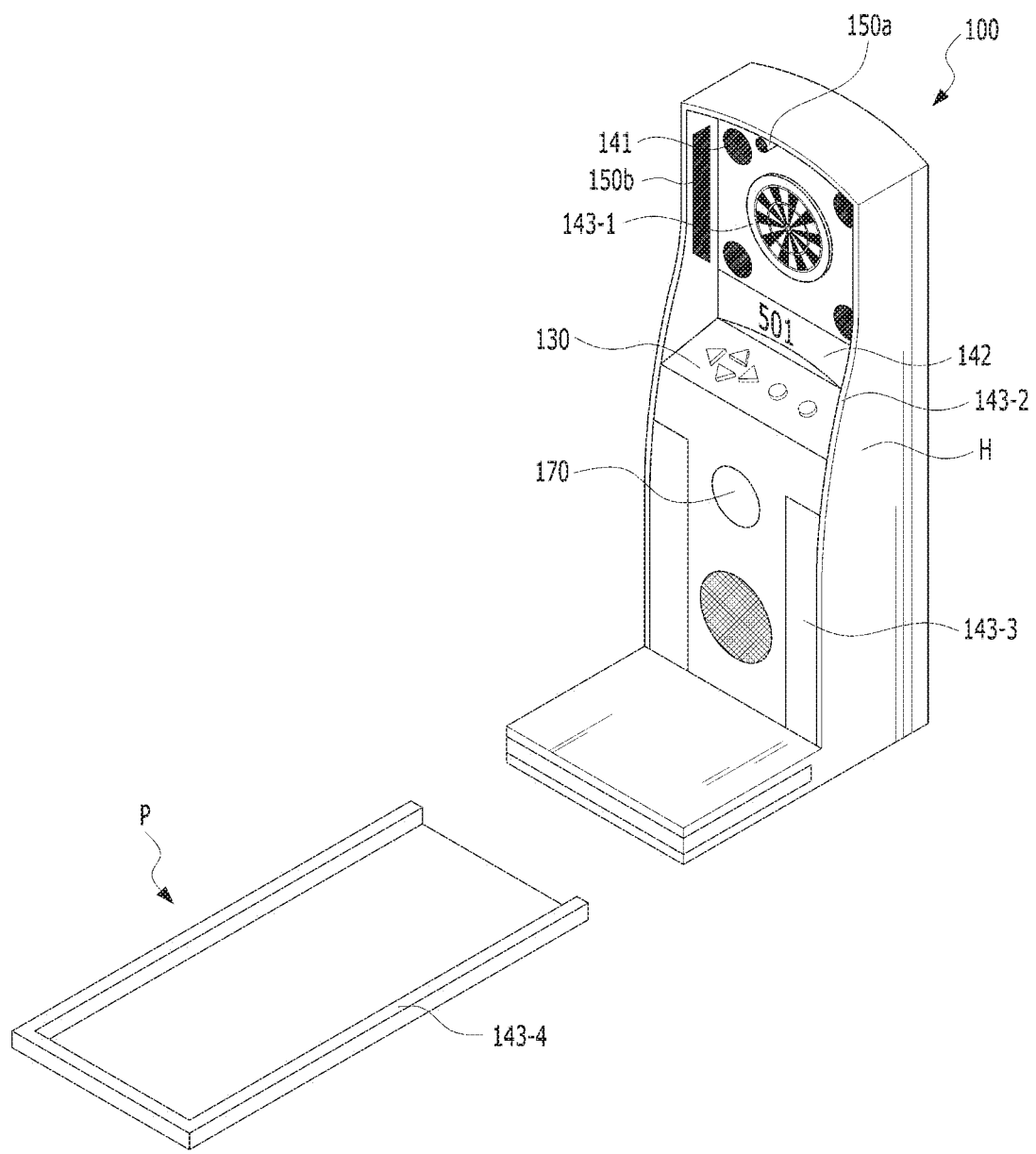
FIG. 3 is a perspective view of the dart game apparatus according to the exemplary embodiments of the present disclosure.

FIG. 3 is a perspective view of the dart game apparatus according to the exemplary embodiments of the present disclosure.

As illustrated in FIG. 3, the dart game apparatus 100 according to the exemplary embodiments of the present disclosure may be formed by mounting the components illustrated in FIG. 1 in a housing H. The dart target 110, the display 142, the illumination unit 143, the sound output unit 141, the camera unit 150 the player information acquisition unit 170, and the like may be disposed on the front surface of the dart game apparatus 100.

The target 110 may be disposed so that a dead center is positioned at a position (for example, 5 feet 8 inches in a vertical direction from the ground) which conforms with a rule of the dart game. The illumination units 143-1, 143-2, and 143-3 may be disposed at various parts of the dart game apparatus 100 to transfer various and variable visual effects to the player of the dart game apparatus 100. For example, the illumination unit 143-1 is disposed at the side of the target 110 and may serve to irradiate an illumination to the target 110. The illumination unit 143-1 may also output a predetermined illumination effect according to an event of the dart game. Further, the illumination unit 143-1 may output illumination effects having various colors.

The illumination unit 143-2 may be formed to be extended in a vertical direction along a forward projection of the housing H. Like the illumination unit 143-1, the illumination unit 143-2 may output a predetermined illumination effect according to an event of the dart game and output illumination effects having various colors.

The illumination unit 143-3 may be disposed on the top and/or the side of the housing H. The illumination unit 143-3 may output a predetermined illumination effect according to an event of the dart game and output illumination effects having various colors. Particularly, the illumination unit 143-3 may output an illumination effect for an event related with the user recognition unit.

Optionally, the dart game apparatus 100 may be selectively connected with another dart game apparatus and include a dart plate P which is extended in a horizontal direction. The dart plate P may further include an illumination unit 143-4. The dart plate P may be integrally coupled with or selectively attached to or detached from the dart game apparatus 100.

When the dart plate P is integrally coupled with or selectively attached to the dart game apparatus 100, the dart plate P may be electrically connected with the dart game apparatus 100. The illumination unit 143-4 of the dart game apparatus 100 may be disposed along the outside of the dart plate P as illustrated in FIG. 3. One end of the dart plate P may be extended to a place where a throw-line is to be positioned according to a distance of the throw-line from the dart target according to a rule of the game. The illumination unit 143-4 may be disposed at a position corresponding to the throw-line.

Although not illustrated in FIG. 3, an illumination unit (not illustrated) is disposed at the bottom of the dart target 110 to irradiate an illumination effect in a user (player) direction. The illumination unit (not illustrated) may include a combination of different illumination elements allocated according to each segment configuring the dart target.

The housing H of the dart game apparatus 100 may include the display 142 disposed in the user direction. The display 142 may display information required for the user according to the progress of the dart game (for example, a collected score, information on a player which is playing the game, a score required for clearing the corresponding game, information of an opposite player which does not play the game, information on a speed of the dart pin, information of comparison of the speed of the dart pin, and the like). The display 142 may display a visual effect according to an event depending on the progress of the dart game. For example, when the user continuously hits a bullseye at the dead center of the dart target 100 with three dart throw chances, the display 142 may display a pre-stored motion picture corresponding to the corresponding event. The motion picture may be stored in the memory 180 of the dart game apparatus 100 or received from a server through the network connection unit 160.

The display 142 may provide the user with visual and audible effects according to occurrence of the event by interlocking with the illumination units 143-1, 143-2, 143-3, and 143-4 and the sound output module 141. In other words, when a predetermined event occurs, the display 142, the illumination units 143-1, 143-2, 143-3, and 143-4, and the sound output module 141 may output an illumination effect, a display effect, and a sound effect with respect to the corresponding event together.

In FIG. 3, it is illustrated that the display 142 are disposed at the lower end of the target 110, but the number and disposed positions of displays 142 may be variously modified.

The player input unit 130 according to the exemplary embodiments of the present disclosure may be configured in a key pad button form as illustrated in FIG. 3. Further, the player input unit 130 may be configured in the dart game apparatus 100 according to the exemplary embodiments of the present disclosure in various types including the touch screen. The user operates a key button of the player input unit 130 to select a mode of a game to be played by the user, an offline matching request, and the match approval.

The sound output module 141 according to the exemplary embodiments of the present disclosure is also disposed on the front surface of the housing H of the dart game apparatus 100 to output a sound. The number and disposed positions of sound output modules 141 may also be variously modified.

The camera unit 150 according to the exemplary embodiments of the present disclosure may be mounted on the top of the housing H of the dart game apparatus 100 as illustrated in FIG. 3. The position at which the camera unit 150 is disposed may be variable. The camera unit 150 may include one or more cameras 151 to 153 which may photograph the target 110 and the throw line. The image photographed through the camera unit 150 may be transferred to the memory 180. Alternatively, the image photographed through the camera unit 150 may be transferred to the server or another dart game apparatus through the network connection unit 160. In exemplary embodiments of the present disclosure, only some of the motion pictures photographed by the camera unit 150 may be finally stored in the memory 180 or transferred to the server through the network connection unit 160.

Although not illustrated in FIG. 3, the player information acquisition unit 170 may be disposed at various locations of the front surface of the housing H of the dart game apparatus 100 and include the short range communication module. The user throws the dart pin to which the user identification module is coupled to complete the user authentication. Additionally, the user touches a smart card for recognizing the user near the player recognition unit 130 to complete the user authentication.

The contents illustrated in FIG. 3 and the description of the exterior of the aforementioned dart game apparatus 100 are just an example proposed for description, and the dart game apparatus 100 according to the present disclosure is not limited to the exterior illustrated in FIG. 3.

Figure 4:
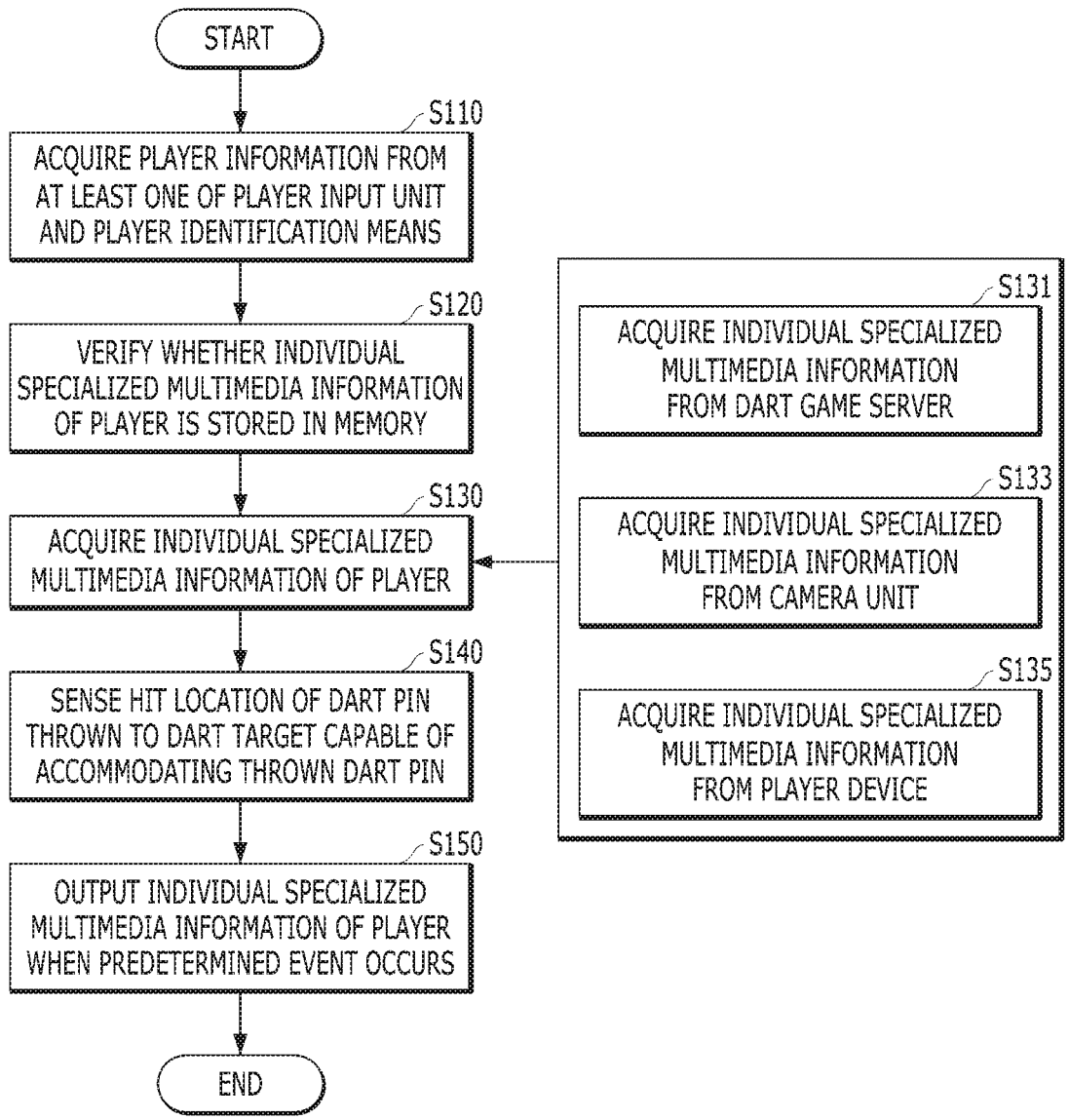
FIG. 4 illustrates a flowchart of a dart game method according to exemplary embodiments of the present disclosure.

FIG. 4 illustrates a flowchart of a dart game method according to exemplary embodiments of the present disclosure.

Steps illustrated in FIG. 4 may be performed by the dart game apparatus 100 (see FIG. 3). As one example, the method illustrated in FIG. 4 may be performed by hardware or an OS itself of the apparatus. That is, some or all of the steps illustrated in FIG. 4 may be operated or generated by the dart game apparatus 100 (see FIG. 3). Alternatively, some or all of the steps illustrated in FIG. 4 are executable by one or more processors and may be performed by the dart game apparatus 100 (see FIG. 3) according to a program stored in a computer-readable medium, which includes commands which cause the one or more processors to perform the operations. Optionally or alternatively, some or all of the steps illustrated in FIG. 4 are operated or generated by a server and the operated or generated information is received by the dart game apparatus 100 (see FIG. 3) to implement the corresponding information.

The computer program stored in the computer-readable storage medium according to the exemplary embodiments of the present disclosure is executable in one or more processors and may include commands which cause the one or more processors to perform the following operations.

Since the dart game apparatus and the computer program according to the exemplary embodiments of the present disclosure are described in FIGS. 1 and 3, the steps of the method for providing the individual specialized multimedia information to the player according to the exemplary embodiments of the present disclosure will be hereinafter described in brief with reference to FIG. 4.

According to the exemplary embodiments of the present disclosure, the player information may be acquired from least one of the player input unit and the player identification means (S110).

According to the exemplary embodiments of the present disclosure, the player information may include at least one of gender information of the player, age information of the player, local information of the player, rating information of the player, the point per dart (PPD) information of the player, mark per round (MPR) information of the player, and ranking information of the player and the scope of the present disclosure is not limited thereto.

The identification means of the player according to the exemplary embodiments of the present disclosure may include at least one of the smart card and the dart pin. Further, the identification means of the player according to the exemplary embodiments of the present disclosure may be formed while being coupled with a player identification module including one of an NFC module, an RFID module, and a microchip.

The dart pin 400 (see FIG. 11) according to the exemplary embodiments of the present disclosure may have a player identification module 405. The player identification module 405 may include the short range communication modules including the Bluetooth, the NFC, the RFID, the IC chip, and the microchip and the scope of the present disclosure is not limited thereto. This will be described below with reference to FIGS. 10 to 13.

According to the exemplary embodiments of the present disclosure, it may be verified whether the individual specialized multimedia information of the player is stored in the memory (S120).

According to the individual specialized multimedia providing method according to the exemplary embodiments of the present disclosure, it may be additionally verified whether the player information acquired from at least one of the player input unit and the player identification means and the player information which is prestored to correspond to the player are the same as each other. When the acquired player information and the presorted player information are the same as each other, the individual specialized multimedia information of the player, which is stored in the memory to correspond to the player information may be searched.

When the individual specialized multimedia information of the player is not stored in the memory, the individual specialized multimedia information of the player may be acquired according to the exemplary embodiments of the present disclosure (S130).

Figure 5:
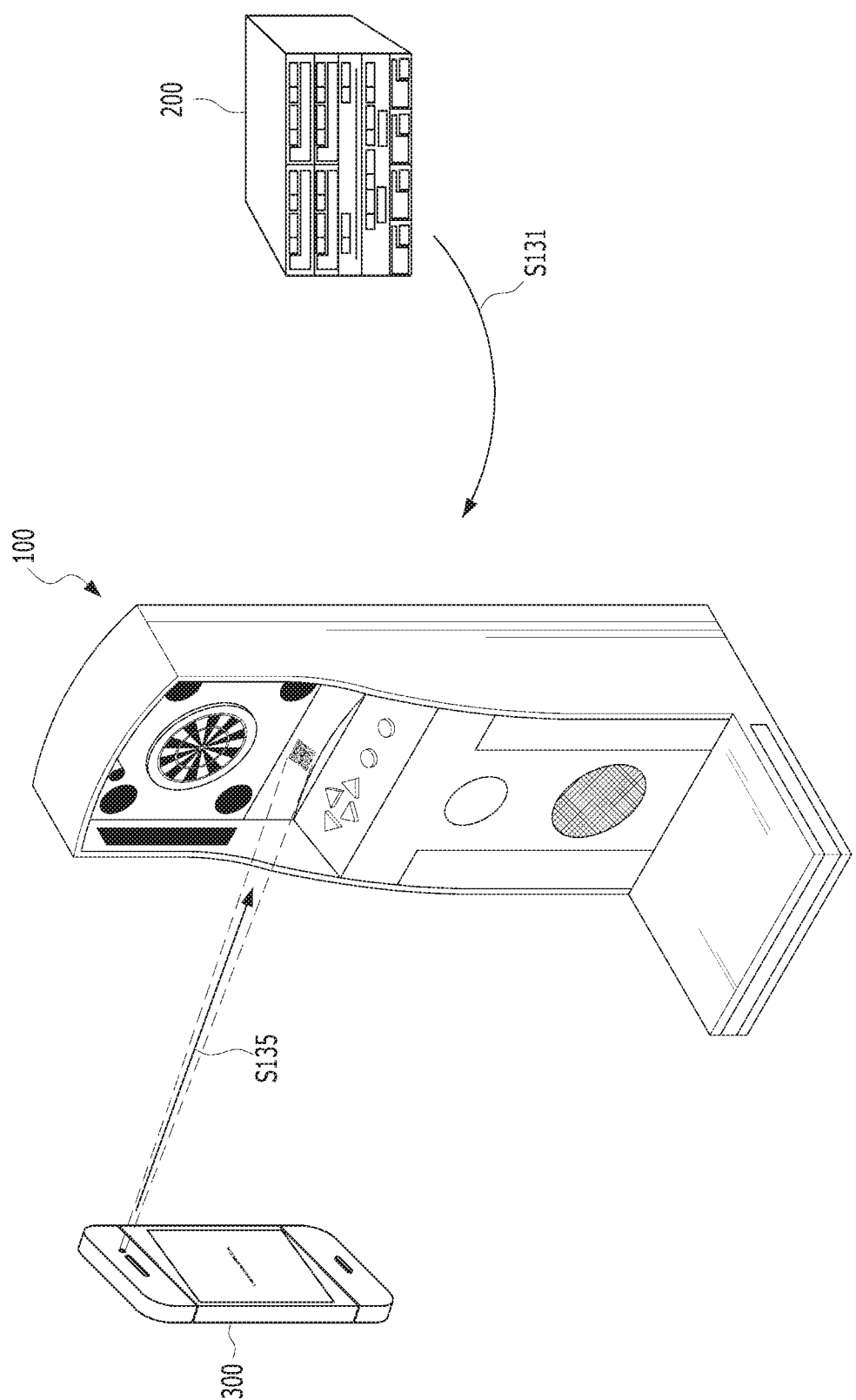
FIG. 5 is an exemplary diagram of a method for receiving individual specialized multimedia information according to the exemplary embodiments of the present disclosure.

FIG. 5 is an exemplary diagram of a method for receiving individual specialized multimedia information according to the exemplary embodiments of the present disclosure. Referring to FIG. 5, the individual specialized multimedia information according to the exemplary embodiments of the present disclosure may be acquired through at least one of steps S131, S133, and S135 and the scope of the present disclosure is not limited thereto.

According to the exemplary embodiments of the present disclosure, the individual specialized multimedia information may be acquired from the dart game server (S131). To this end, the dart game apparatus 100 may include the network connection unit for communication with the dart game server through the network.

According to the exemplary embodiments of the present disclosure, the individual specialized multimedia information may be acquired from the camera unit of the dart game apparatus 100 (S133). The camera unit of the dart game apparatus 100 may include a photographing module disposed to photograph at least a part of the dart game player in order to acquire the individual specialized multimedia information of the player.

According to the exemplary embodiments of the present disclosure, the individual specialized multimedia information may be acquired from the player device (S135). The dart game apparatus 100 transmits/receives information to/from the player device of the player connected by the short-range module including at least one of Bluetooth, radio frequency identification (RFID), infrared data association (IrDA), ultra wideband (UWB), ZigBee, near field communication (NFC), and Beacon to acquire the individual specialized multimedia information of the player.

When there is no individual specialized multimedia information of the player stored in the dart game apparatus 100 and/or the dart game server 200 derivation information for causing the player to receive the individual specialized multimedia information may be presented to the dart game apparatus 100 and/or the player device 300. The individual specialized multimedia derivation information according to the exemplary embodiments of the present disclosure may include at least one of information for causing the player to announce that the individual specialized multimedia information does not exist and information for generating the individual specialized multimedia information and this does not limit the scope of the present disclosure.

According to the exemplary embodiments of the present disclosure, the hit location of the dart pin thrown to the dart target capable of accommodating the thrown dart pin may be sensed (S140).

According to the exemplary embodiments of the present disclosure, when a predetermined event occurs, the individual specialized multimedia information of the player may be output (S150).

Herein, the predetermined event may include at least one of an event of receiving the player input, a dart game start approval event for allowing the player to play the dart game in the dart game apparatus, an event of acquiring the player information, an event at least partially based on a predetermined score, a player matching event, and a reward decision event for providing the reward and the scope of the present disclosure is not limited thereto.

In additional exemplary embodiments of the present disclosure, the display 142 may show event information to output the individual specialized multimedia information of the user to the user. For example, the display 142 outputs a dart target shape and displays a color of a region of "12 triple" to be different from the colors of other regions while playing the dart game to display the individual specialized multimedia information to be output when the dart pin hits "12 triple".

FIGS. 6 to 9 are exemplary diagrams illustrating an example of individual specialized multimedia information which may be output from the dart game apparatus according to the exemplary embodiments of the present disclosure.

Figure 6:
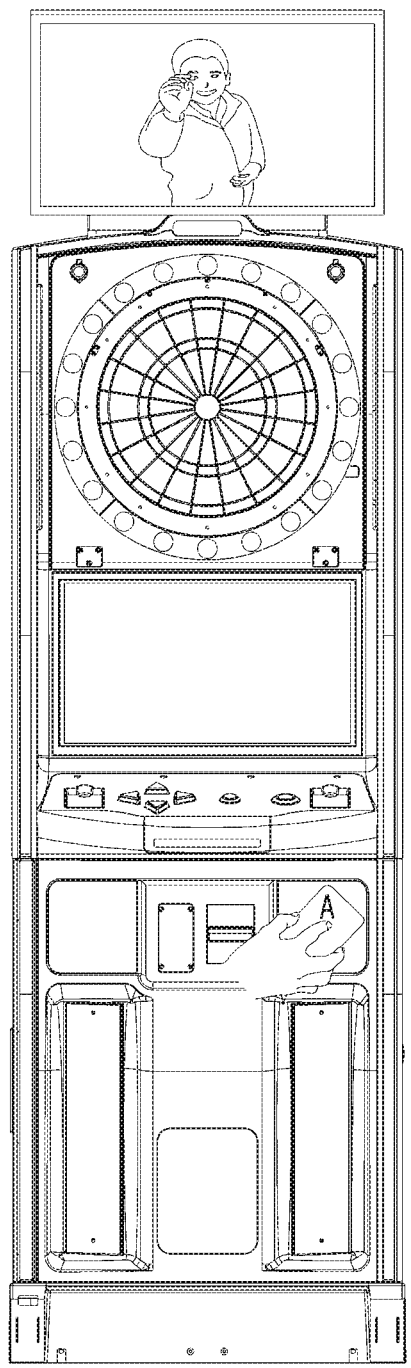
FIG. 6 is an exemplary diagram illustrating an example of individual specialized multimedia information which may be output from the dart game apparatus according to the exemplary embodiments of the present disclosure.
Figure 7:
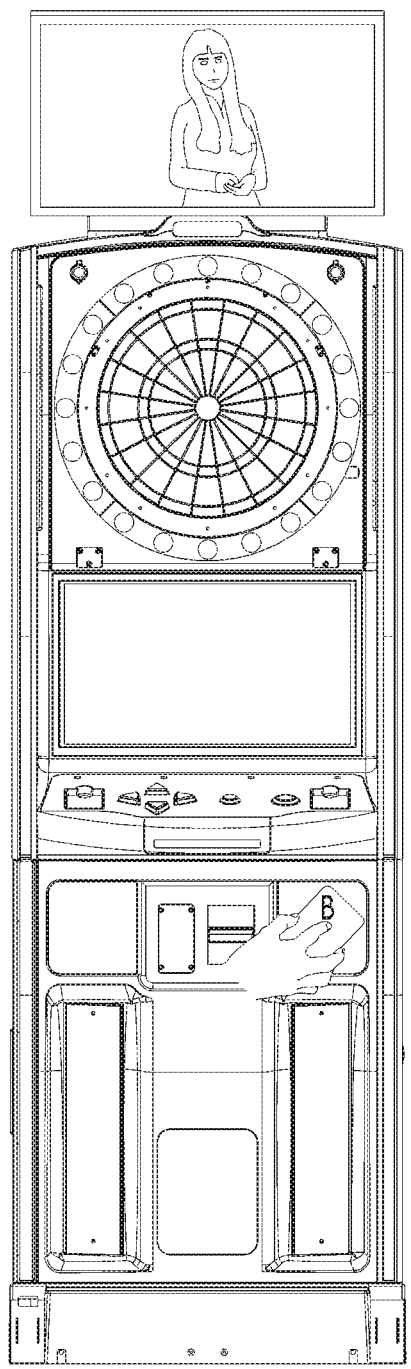
FIG. 7 is an exemplary diagram illustrating an example of individual specialized multimedia information which may be output from the dart game apparatus according to the exemplary embodiments of the present disclosure.

It is assumed that the first player and the second player who play the dart game exist. Referring to FIGS. 6 and 7, the individual specialized multimedia information which may be provided to the first player and the second player may be different from each other.

Figure 8:
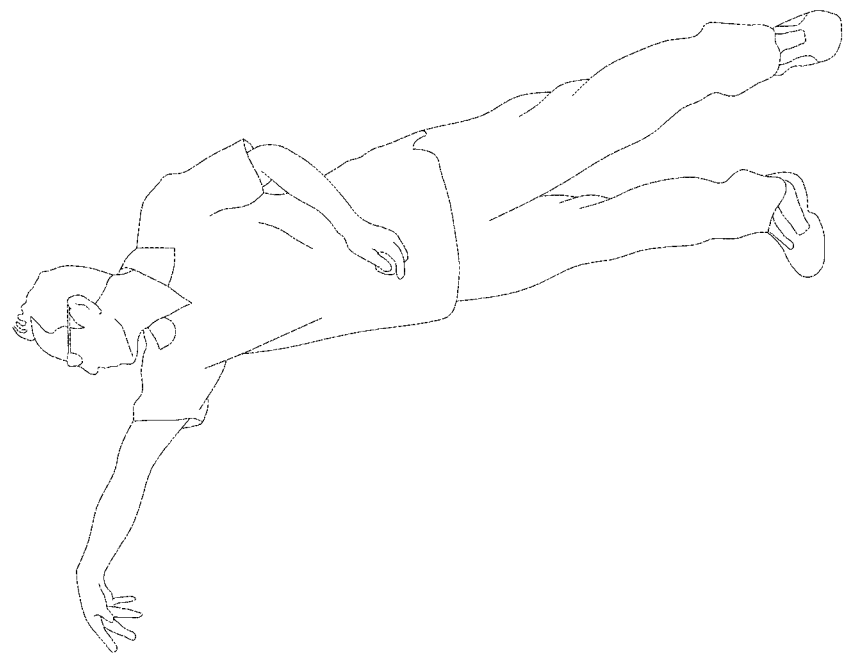
FIG. 8 is an exemplary diagram illustrating an example of individual specialized multimedia information which may be output from the dart game apparatus according to the exemplary embodiments of the present disclosure.
Figure 8:
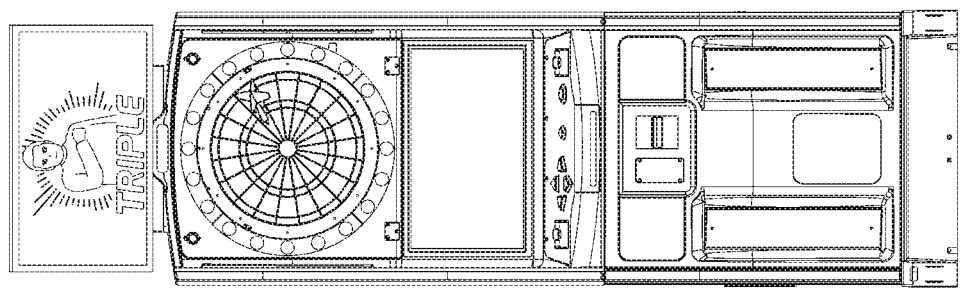
Figure 9:
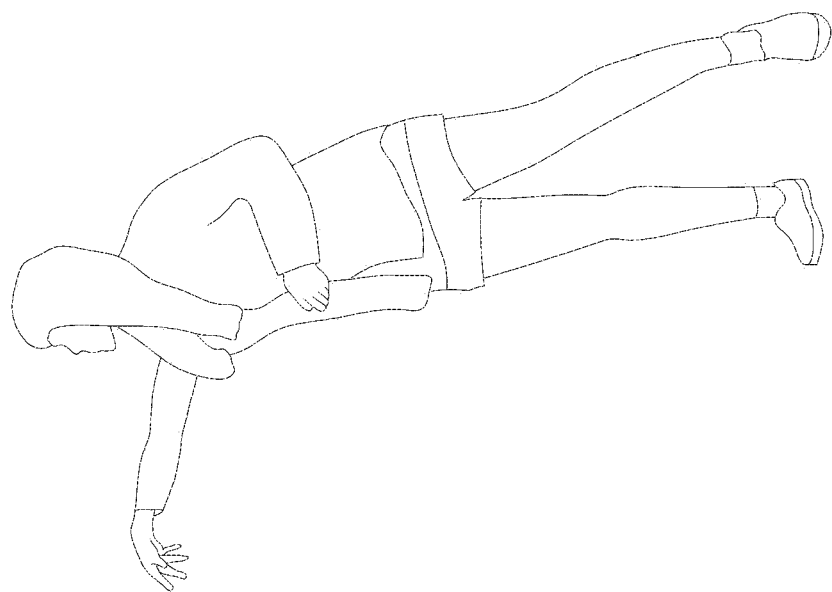
FIG. 9 is an exemplary diagram illustrating an example of individual specialized multimedia information which may be output from the dart game apparatus according to the exemplary embodiments of the present disclosure.
Figure 9:
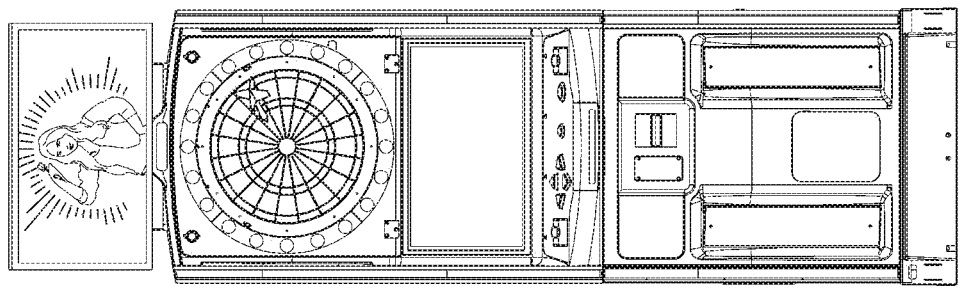

In more detail, it is assumed that the dart pin thrown by the dart game player is sensed in the triple area. Referring to FIGS. 8 and 9, the individual specialized multimedia information which may be provided to the first player and the second player may be different from each other.

According to the exemplary embodiments of the present disclosure, which include the steps, when the player input is received from the player, the individual specialized multimedia information may be provided. Alternatively, when the player information is acquired from at least one of the player input unit and the player identification means, the individual specialized multimedia information may be provided. For example, in more detail, when the player identification means (e.g., the smart card) of the player contacts the dart game apparatus 100 and the player information regarding the player is acquired from the player identification means, the individual specialized multimedia information of the player may be provided to the display unit 142.

The individual specialized multimedia information may be configured by information which is different for each predetermined event. For example, in the case where the hit location of the dart pin thrown by the player corresponds to the triple area and in the case where the hit location of the dart pin thrown by the player corresponds to the double area, different individual specialized multimedia information may be provided.

Some operation(s) among the illustrated operations may be omitted according to the exemplary embodiments of the present disclosure. Furthermore, the operations illustrated in FIG. 4 are exemplary and an additional operation may also be included in the scope of the present disclosure.

Hereinafter, the dart pin which is one example of the identification means of the player according to the exemplary embodiments of the present disclosure will be described.

Figure 10:
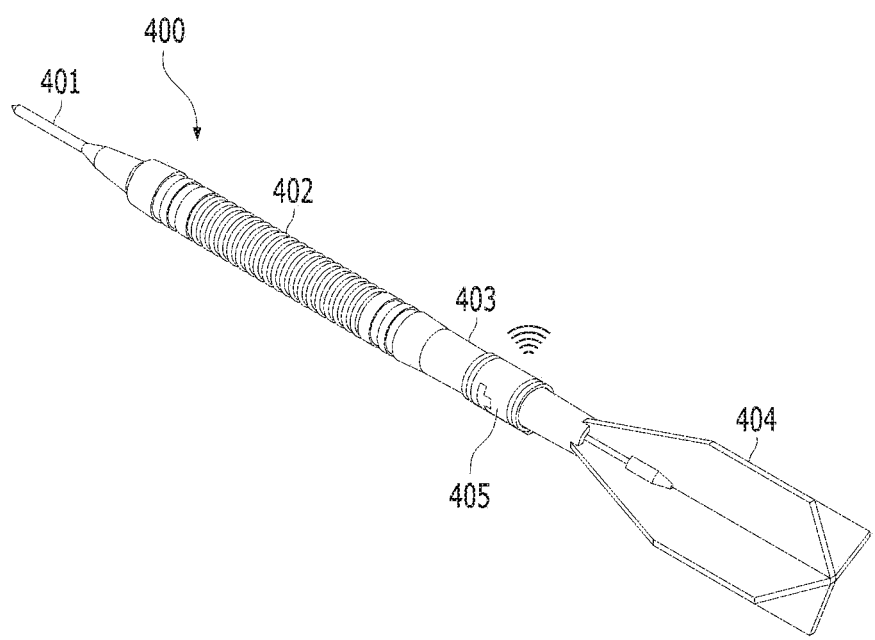
FIG. 10 is an exemplary diagram illustrating an example of a dart game method according to exemplary embodiments of the present disclosure.

FIG. 10 exemplarily illustrates a shape of a dart pin according to exemplary embodiment of the present disclosure.

Figure 11:
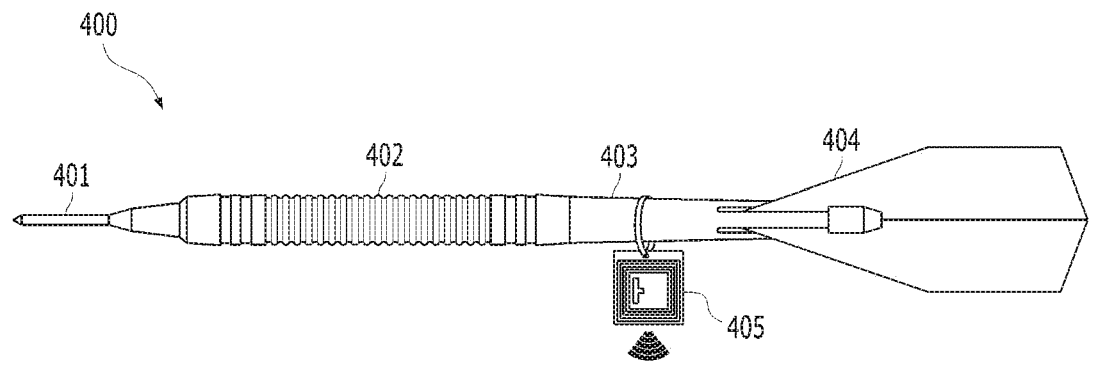
FIG. 11 exemplarily illustrates the shape of a dart pin according to the exemplary embodiments of the present disclosure.

FIG. 11 exemplarily illustrates the shape of the dart pin according to the exemplary embodiments of the present disclosure.

Figure 12:
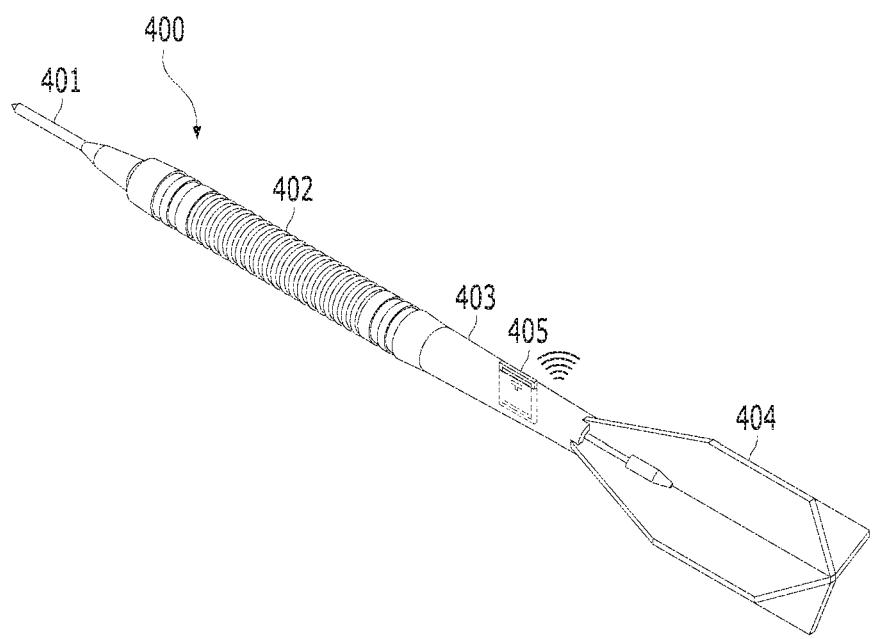
FIG. 12 exemplarily illustrates a shape of a dart pin according to the exemplary embodiments of the present disclosure.

FIG. 12 exemplarily illustrates the shape of the dart pin according to the exemplary embodiments of the present disclosure.

The dart pin 400 according to the exemplary embodiments of the present disclosure may include both a dart pin of a soft dart and a dart pin of a hard dart.

As illustrated in FIGS. 10 to 12, the dart pin 400 according to the exemplary embodiments of the present disclosure may be constituted by a tip 401, a barrel 402, a shaft 403, a flight 404 and a user identification module 405. In addition, the shape of the dart pin 400 illustrated in FIGS. 10 to 12 is merely an example, and dart pins having various shapes may exist. For example, in FIG. 10, it is illustrated that a plurality of grooves and/or protrusions exists on the outer periphery of the barrel 402, but the shape of the barrel 402 not including the groove and/or protrusion may also be included within the scope of the present disclosure.

In the exemplary embodiments of the present disclosure, the tip 401 may form one end of the dart pin 400 and one end may contact the dart target of the dart game apparatus. That is, the tip 401 may directly hit the dart target (alternatively, dart board). In the case of the hard dart (alternatively, steel dart), the tip 401 may be made of a metallic material and in the case of the soft dart, the tip 410 may be made of a plastic material. The tip 401 may also be referred to as a short tip or a long tip according to the size of the tip 401 in the case of the soft dart.

In the exemplary embodiments of the present disclosure, one end of the barrel 402 is coupled with the other end of the tip 401 to form a body of the dart pin 400. In general, the barrel 402 may be made of metal and may have various weights, materials, weight centers, cutting methods, and the like. For example, the metal which may configure the barrel 402 may include various types of metals including brass, tungsten, nickel, and a combination thereof.

In the exemplary embodiments of the present disclosure, one end of the shaft 403 may be coupled with the other end of the barrel 402. The shaft 403 may connect the barrel 402 and the flight 404. The shaft 403 may have various lengths or materials and become one element for determining the weight center of the dart pin 400.

In the exemplary embodiments of the present disclosure, the flight 404 may form the other end of the dart pin 400 and one end may be coupled with the other end of the shaft 403. The flight 404 may be associated with a flight of the dart pin 400 and a flight trajectory of the thrown dart pin 400 may vary according to the shape of the flight 404. The flight 404 may be made of various materials including plastic, fabric, and the like.

The components 401, 402, 403, 404 and 405 of the dart pin 400 may be coupled to each other in various forms. For example, each of the barrel 402 and the shaft 403 may include a female or male screw-shaped groove or protrusion and as each of the barrel 402 and the shaft 403 rotates clockwise or counterclockwise, two components may be coupled to each other. Additionally, the components 401, 402, 403, 404, and 405 of the dart pin 400 may be connected to each other by various coupling and attachment methods including injection molding, ultrasonic fusion, and the like.

The dart pin 400 according to the exemplary embodiments of the present disclosure may have a user identification module 405. The user identification module 405 may include the short range communication modules including the Bluetooth, the NFC, the RFID, the IC chip, and the microchip and the scope of the present disclosure is not limited thereto.

The user identification module 405 according to the exemplary embodiments of the present disclosure may be coupled with at least one of the tip 401, the barrel 402, the shaft 403, and the flight 404 of the dart pin 400. For example, the user identification module 405 may be attached onto the outer periphery or inserted into the inside of the shaft 403. When the user identification module 405 is inserted into the inside of the shaft 403, the shaft 403 may include an opening for forming a space for inserting the user identification module 405 into the inside of the shaft 403.

As another example, the user identification module 405 may have a ring shape or a circular shape to be attached to cover the outer periphery of the shaft 403. When the user identification module 405 is attached onto the outer periphery of the shaft 403, the user identification module 405 may serve as a handle part of the dart pin 400 which may provide an excellent grip feeling of the dart to the user. Alternatively, the user identification module 405 may display the handle part of the dart pin 400. The user identification module is attached on the side of one of the barrel 402 and the shaft 403 to display the handle part of the dart pin 400.

The user identification module 405 may include a shape attachable to/detachable from the dart pin 400.

As yet another example, the user identification module 405 may be (detachable from) attachable to a part (for example, a rear part) of the flight 404 to allow the user to control the flight trajectory or the weight center of the dart pin 400. Accordingly, when the tip 401 of the dart pin 400 contacts the dart target of the dart game apparatus, the user information, the identification information, or the unique number of the dart pin 400 may be transferred to the dart game apparatus through the user identification module 405.

As still yet another example, the user identification module 405 may have a pipe shape to cover the outer periphery of the shaft 403 of the dart pin 400.

In the aforementioned example, it is described that the user identification module 405 is coupled with the shaft 403 of the dart pin 400 as an example, but the user identification module 405 may be coupled to the tip 401, the barrel 402, and/or the flight 404 of the dart pin 400 in a similar method.

For example, in the case where the user identification module 405 is attached to the outer periphery of the barrel 402 made of the metal material, in order to prevent an interference phenomenon of an electromagnetic wave caused by the metallic material, a pipe or ring-shaped member made of a separate nonconductive material may be bound to the outer periphery of the barrel 402 and the user identification module 405 may be attached to the outer periphery of such a member.

Alternatively, the user identification module 405 may be coupled to surround the outer periphery of a portion of the component of the dart pin 400 and a separate cover is additionally coupled to surround the outer periphery of the coupled user identification module 405 to protect the user identification module 405 from an external impact.

Referring to FIG. 11, the user identification module 405 may, for example, be coupled to a portion of a ring-shaped binding portion to be coupled to one component (for example, the shaft 403) of the dart pin 400. The aforementioned coupling method is just an example and the user identification module 405 may be coupled to the dart pin 400 without the separate binding portion or the user identification module 405 may be coupled to the dart pin 400 together with binding portions having various shapes. That is, various coupling methods between the dart pin 400 and the user identification module 405 may also exist.

Referring to FIG. 12, the user identification module 405 may be inserted into a part of the dart pin 400. The user identification module 405 may be inserted into the insides of the components 401, 402, 403, and 404 of the dart pin 400 by various methods.

As illustrated in FIG. 12, when the user identification module 405 is inserted into the inside of the shaft 403, the shaft 403 may include the opening for forming the space for inserting the user identification module 405 into the inside of the shaft 403.

In FIG. 12, it is illustrated that only a part of the user identification module 405 is inserted into the inside of the dart pin 400, but the entirety of the user identification module 405 is inserted into the inside of the dart pin 400 so as not to externally view the user identification module 405. Further, the user identification module 405 illustrated in FIG. 12 may be inserted to be detachable from the shaft 403 of the dart pin 400.

In the exemplary embodiments of the present disclosure, the user identification module 405 may be inserted into a space of a joining portion of the barrel 402 and the shaft 403 of the dart pin 400. When the barrel 402 and the shaft 403 are coupled to each other, in the case where a radius or a diameter of one component of the barrel 402 and the shaft 403 is manufactured with a larger size, the user identification module 405 may be formed with a thickness as large as a difference of the radius or diameter. As a result, as the user identification module 405 is inserted, the coupling of the barrel 402 and the shaft 403 may be strengthened. Although the barrel 402 and the shaft 403 have been described in the above example, the component(s) into which the user identification module 405 is inserted is(are) not limited thereto. Additionally, the user identification module 405 may be coupled to a plurality of components among the components of the dart pin 400.

Figure 13:
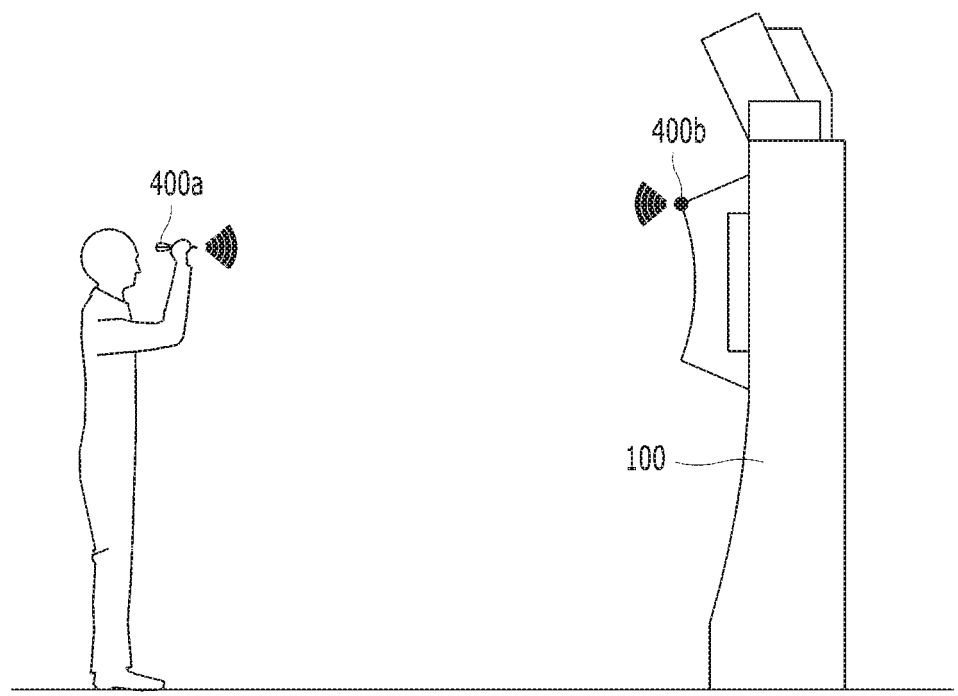
FIG. 13 illustrates a dart pin and a dart game apparatus according to the exemplary embodiments of the present disclosure.

FIG. 13 illustrates a dart pin 400a and the dart game apparatus 100 according to the exemplary embodiments of the present disclosure.

When the dart pin 400a is thrown by the user, the user identification module included in the dart pin 400a and a player authentication unit 400b of the dart game apparatus 100 may exchange data through the short range communication.

For example, when the user holds the dart pin 400a and prepares for throwing the dart pin 400a, or when the dart pin 400a is thrown or the dart pin 400a is thrown to reach the dart target, the identification information included in the dart pin 400a may be transferred to the dart game apparatus 100. In this case, the dart game apparatus 100 may perform a log-in procedure for performing the dart game based on the transferred identification information. As a result, the log-in procedure may be implemented through the short range communication between the dart pin 400a and the player authentication unit 400b of the dart game apparatus 100 without a separate log-in procedure.

According to the exemplary embodiments of the present disclosure, a unique number may be allocated to the dart pin 400a. The unique number may be transferred to the dart game apparatus and the server and a user number which matches the unique number may be searched in the server. Alternatively, the user information may be input in the dart pin 400a, and the inputted user information may be transferred to the dart game apparatus to recognize the user in the dart game apparatus.

Therefore, through the short range communication between the user identification module coupled to the dart pin 400a and the player authentication unit 400b of the dart game apparatus, it is possible to allow the user to enjoy a user experience better than the dart game apparatus in the related art in performing the dart game.

Figure 14:
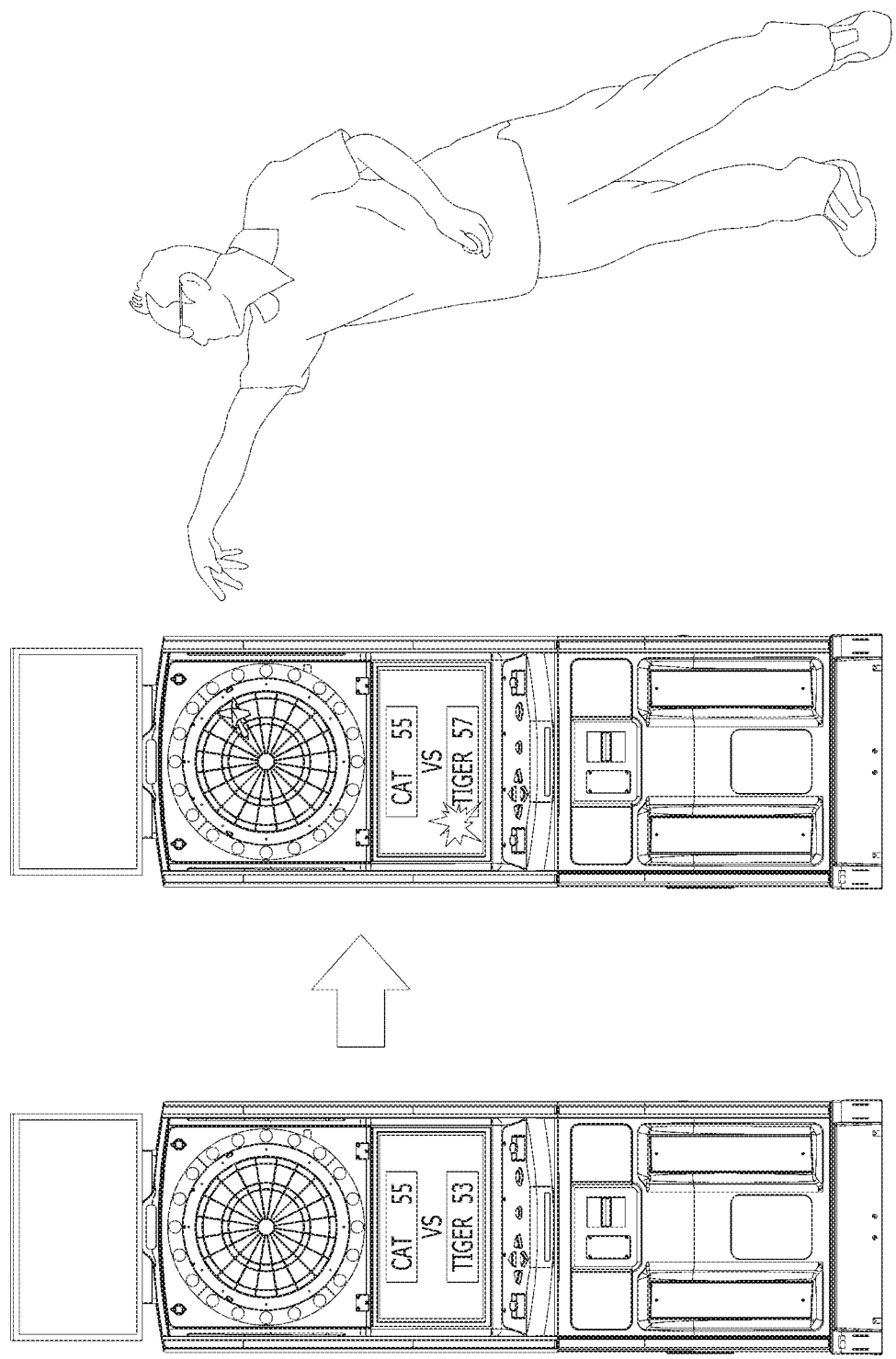
FIG. 14 is an exemplary diagram illustrating an example of an event effect which may be output from the dart game apparatus according to the exemplary embodiments of the present disclosure.

FIG. 14 is an exemplary diagram illustrating an example of an event effect which may be output from the dart game apparatus according to the exemplary embodiments of the present disclosure.

According to the exemplary embodiments of the present disclosure, it is assumed that a first player (e.g., 'CAT') and a second player (e.g., 'TIGER') which play the dart game exist. A display unit 142 may include a first area displaying score information of the first player and a second area displaying the score information of the second player. For example, the first area displaying the score information of the first player may display '55 which is the score information of 'CAT' which is the first player and the second area displaying the score information of the second player may display '53' which is the score information of 'TIGER' which is the second player.

In more detail, it is assumed that the dart pin thrown by 'TIGER' which is the second player is accommodated in an area of 4 points of the dart target. The sensing unit 120 may sense the hit location of the dart pin thrown to the area of 4 points of the dart target and the controller 190 may determine the score information of two or more players based on the hit location of the dart pin thrown to the area of 4 points by the sensing unit. For example, the controller 190 may determine '53' which is the score information of the second player as '57' based on the hit location of the dart pin of the area of 4 points, which is thrown by 'TIGER' which is the second player. Further, the controller 190 may compare the score information of two or more players with each other. For example, the controller 190 compares the score information '55' of 'CAT' which is the first player with the score information '57' of 'TIGER' which is the second player with each other to determine that the score information of the second player is dominant.

The display unit 142 may output the event effect determined based on a result of comparing the score information with each other. For example, the result of comparing the score information with each other may include the tie, the dominance, the overtaking, a chase, and the like but the comparison result is not limited thereto. Further, the event effect may include various visual effects, auditory effects, tactile effects, and olfactory effects and is not limited thereto.

The display unit 142 may display the event effect in one of the first area and the second area. For example, when the score of the first player and the score of the second player are tied with each other by the dart thrown by the first player, the display unit 142 may output the event effect 'tie!!!' to the first area.

In the exemplary embodiments of the present disclosure, the controller 190 compares the score information of two or more players with each other to select an overtaking event effect when the dominance of the score information of the first player and the score information of the second player is changed. The display unit 142 may output the selected overtaking event effect when the overtaking event effect is selected by the controller. For example, when 'TIGER' which is the second player acquires 4 points and the score information of the second player becomes thus '57', the controller 190 may compare the score information '55' of 'CAT' which is the first player and the score information '57' of 'TIGER' which is the second player. Therefore, the controller 190 may select the overtaking event effect because the score information of 'TIGER' which is the second player is changed to be dominant. Therefore, the display unit 142 may output the selected overtaking event effect to the second area. However, the event effect is not limited thereto and various overtaking event effects may be output to the first area or both the first area and the second area.

Figure 15:
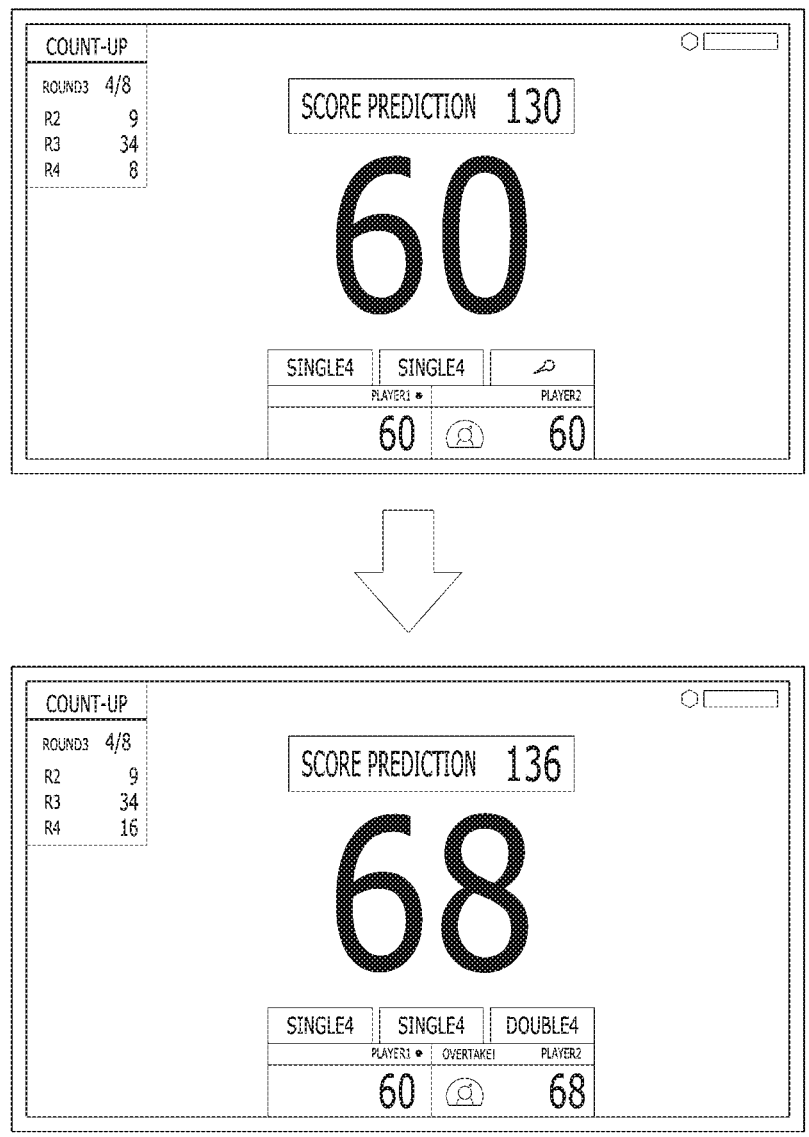
FIG. 15 is an exemplary diagram illustrating an example of a UI of the event effect which may be output from the dart game apparatus according to the exemplary embodiments of the present disclosure.

FIG. 15 is an exemplary diagram illustrating an example of a UI of the event effect which may be output from the dart game apparatus according to the exemplary embodiments of the present disclosure.

According to the exemplary embodiments of the present disclosure, which include the steps, it is assumed that 'PLAYER2' which is the second player throws the dart to the hit location of DOUBLE 4 to acquire 8 points.

Since the score information of 'PLAYER1' which is the first player is '60' and the score information of 'PLAYER2' which is the second player is '60', the score information of 'PLAYER2' which is the second player becomes '68' by the acquired 8 points to be changed to be dominant. In this case, the overtaking event effect may be output to the second area. For example, the overtaking event effect 'overtake' may be output next to 'PLAYER2'. However, the event effect is not limited thereto and the overtaking event effect may be output to the first area. Further, the same or different overtaking event effects may be output to both the first area and the second area.

Although not illustrated, on the contrary, when the score information of 'PLAYER1' which is the first player is changed to be dominant, the overtaking event effect may be output to the first area. For example, the overtaking event effect 'overtake' may be output next to 'PLAYER2'. However, the event effect is not limited thereto and the overtaking event effect may be output to the first area. Further, the same or different overtaking event effects may be output to both the first area and the second area.

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various exemplary logic blocks, modules, and circuits described in association with the embodiments disclosed herein may be implemented or performed by a general processor, a digital signal processor (DSP), an application specific integrated circuit (ASIC), a field programmable gate array (FPGA) or another programmable logic device, discrete gate or transistor logic, discrete hardware components, or predetermined combinations thereof designed to perform functions described herein. The universal processor may be the microprocessor, and alternatively, the universal processor may be a predetermined conventional processor, controller, microcontroller, or state machine. The processor may also be implemented as combinations of computing devices, for example, combinations of the DSP and the microprocessor, the plurality of microprocessors, and one or more microprocessors connected with the DSP core, or a predetermined other configuration.

It will be appreciated that a specific order or a hierarchical structure of steps in the presented processes is one example of exemplary accesses. It will be appreciated that the specific order or the hierarchical structure of the steps in the processes within the scope of the present disclosure rimy be rearranged based on design priorities. Appended method claims provide elements of various steps in a sample order, but it does not mean that the method claims are limited to the presented specific order or hierarchical structure.

Steps of a method or algorithm described in association with the exemplary embodiments disclosed herein can be directly implemented as hardware, or implemented as a software module executed by a processor, or a combination thereof. A software module and other data (including, e.g., executable commands and related data) may be stored in a data memory (e.g., a computer-readable medium) such as a RAM, a flash memory, a ROM, an EPROM, an EEPROM, registers, a hard disk, a movable disk, a CD-ROM, or a predetermined other-type storage medium which is technically known. The exemplary storage media may be connected to a machine such as a computer or processor (for convenience, may be referred to as "processor"), and as a result, the processor may read information (e.g., software commands) from the storage media and record the information in the storage media. The exemplary storage media may be integrated with the processor. The processor and the storage medium may be included in the application specific integrated circuit (ASIC). The ASIC may be included in user equipment. Alternatively, the processor and the storage medium may be included in the user device as individual components.

In one or more exemplary designs, described technologies may be implemented through hardware, software, firmware, or a predetermined combination thereof. When the technologies are implemented by the software, the functions may be stored in the computer-readable medium or encoded by the computer-readable medium. The computer-readable medium includes both a computer-readable storage medium and a computer-readable transmission medium including predetermined media that facilitate transmission of a computer program from one location to another location. The storage medium may be a predetermined available medium which may be accessed by a universal computer or a special-purpose computer. As an example, the present disclosure is not limited and the computer-readable storage medium may be accessed by the RAM, the ROM, the EEPROM, the CD-ROM, or another optical disk storage, a magnetic field disk storage, or other magnetic field storage devices, the universal or special-purpose computer, or a universal or special-purpose processor and may include another predetermined medium which may be used to store program code means required in the form of the indications or data structures. As another example, if the software is transmitted from a website, the server, or another remote source by using a coaxial cable, an optical fiber cable, a twist pair, a digital subscriber line (DSL), or wireless technologies such as infrared rays, wireless, and a microwave, the coaxial cable, the optical fiber cable, the twist pair, the digital subscriber line (DSL), or the wireless technologies such as the infrared rays, the wireless, and the microwave are included in a definition of the computer-readable transmission medium. As used herein, a disk and a disc include a compact disk (CD), a laser disk, an optical disk, a DVD, a floppy disk, a blu-ray disk and herein, the discs optically reproduce data with a laser, while the disks generally magnetically reproduce data. Combinations of the aforementioned components will also be included in the range of the computer-readable medium.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the embodiments presented herein, but should be analyzed within the widest range which is consistent with the principles and new features presented herein.

MODE FOR INVENTION

Contents associated with a best mode for carrying out the present disclosure have been described.

INDUSTRIAL APPLICABILITY

The present disclosure relates to a dart game, and more particularly, to a dart game apparatus and a computer program for providing multimedia information, which can increase the entertainment factor of a dart game.

What is claimed is:

1. A dart game apparatus comprising:
   a dart target configured to accommodate a thrown dart pin;
   a sensor configured to sense a hit location of the thrown dart pin;
   a processor configured to:
      determine first score information depending on each of one or more dart pins thrown by a first player based on information on the hit location, which is received from the sensor, determination of the first score information of the first player to be output in response to throwing of the one or more dart pins by the first player,
      permit a second player to throw one or more dart pins when a round of the first player ends,
      determine second score information depending on each of the one or more dart pins thrown by the second player,
      compare the second score information of the second player with the first score information of the first player, and
      determine whether the second score information of the second player is to be output in association with comparison result information based on a result of the comparison; and
   a display configured to output the first and second score information depending on the throwing of the one or more dart pins and the comparison result information according to the processor,
   wherein the comparison result information includes multimedia information that represents an overtaking or a tie, which is prestored in the dart game apparatus, and wherein the multimedia information includes individual specialized multimedia information of the first and second players, which is received from the first and second players and stored in the dart game apparatus.

2. The dart game apparatus of claim 1, wherein the first and second score information include at least one of point per dart (PPD) information, mark per round (MPR) information, score information corresponding to an area allocated to the dart target, and player level information.

3. The dart game apparatus of claim 2, wherein the comparison result information is output simultaneously with the second score information of the second player; and the hit location where the comparison result information is output is associated with the hit location where the second score information of the second player is output.

4. The dart game apparatus of claim 2, wherein the processor further determines the second score information depending on the throwing of the one or more dart pins of the second player to be output together with the comparison result information representing an overtaking or tie when the second score information depending on the throwing of the one or more dart pins of the second player is determined to overtake or tie the first score information of the first player according to the result of the comparison.

5. The dart game apparatus of claim 4, wherein the processor further determines information on a round played by at least one current player and determines whether the round information of the at least one current player corresponds to round information predetermined in the dart game apparatus to determine the second score information depending on the throwing of the one or more dart pins of the second player to be output in association with the comparison result information only when the round information of the at least one current player corresponds to the predetermined round information.

6. The dart game apparatus of claim 4, further comprising:
at least one camera configured to photograph at least one of a part of a dart game player and a part of the dart target,
wherein the processor further determines the second score information depending on the throwing of the one or more dart pins of the second player, the comparison result information representing the overtaking or tie, and photographing information acquired by photographing the throwing of the one or more dart pins of the second player associated with the overtaking or the tie to be output together when a current score of the second player overtakes or ties a current score of the first player.

7. The dart game apparatus of claim 2, wherein the processor further determines score information required for overtaking or making a tie to the first score information of the first player to be output in association with the second score information depending on the throwing of the one or more dart pins of the second player based on the second score information depending on the throwing of the one or more dart pins of the second player.

8. The dart game apparatus of claim 2, wherein the processor further determines the comparison result information representing an overtaking or a tie to be transmitted to a device of the first player or a device of the second player in real time when the second score information depending on the throwing of the one or more dart pins of the second player is determined to overtake or tie the first score information of the first player according to the result of the comparison.

9. The dart game apparatus of claim 1, wherein the first and second score information include:
count-up game score information, which rises or falls depending on the throwing of the one or more dart pins of the first and second players in a count-up game when a dart game played by the first and second players is the count-up game, and
information regarding whether an area of the second player is blocked depending on the throwing of the one or more dart pins of the first and second players in a cricket game and the count-up game score information, which rises depending on the throwing of the one or more dart pins in the cricket game when the dart game played by the first and second players is the cricket game.

10. The dart game apparatus of claim 1, wherein the individual specialized multimedia information of the first and second players is received from a device connected by a short-range module including at least one of Bluetooth, radio frequency identification (RFID), infrared data association (IrDA), ultra wideband (UWB), ZigBee, near field communication (NFC), and Beacon to be stored in the dart game apparatus.

11. The dart game apparatus of claim 1, further comprising:
memory configured to store information required for playing a dart game; and
a transceiver configured to communicate with a dart game server through a network,
wherein the processor further verifies whether the individual specialized multimedia information of the first and second players is stored and determines the individual specialized multimedia information of the first and second players to be acquired from the dart game server or the device when the individual specialized multimedia information of the first and second players is not stored in the memory.

12. A non-transitory computer-readable medium, including code for performing a process to be executed by one or more processors of a computer system, the process comprising:
sensing a hit location of a dart pin thrown to a dart target configured to accommodate the thrown dart pin;
determining score information depending on one or more respective dart pins thrown by a first player based on information on the hit location, the determining of the score information of the first player to be output in response to throwing of the one or more respective dart pins;
permitting a second player to throw the dart pin when a round of the first player ends;
determining score information depending on one or more respective dart pins thrown by the second player;
comparing the score information of the second player with the score information of the first player; and
determining whether the score information of the second player is to be output in association with the comparison result information based on the comparing of the score information of the second player with the score information of the first player,
wherein the comparison result information includes multimedia information that represents an overtaking or a tie, which is prestored in the dart game apparatus, and
wherein the multimedia information includes individual specialized multimedia information of the first and second players, which is received from the first and second players and stored in the dart game apparatus.

13. A dart game method performed by a dart game apparatus, comprising:
sensing a hit location of a dart pin thrown to a dart target configured to accommodate the thrown dart pin;
determining score information depending on one or more respective dart pins thrown by a first player based on information of the hit location, the determining of the score information of the first player to be output in response to throwing of the one or more respective dart pins;
permitting a second player to throw the dart pin when a round of the first player ends;
determining score information depending on one or more respective dart pins thrown by the second player;
comparing the score information of the second player with the score information of the first player; and
determining whether the score information of the second player is to be output in association with comparison result information based on the comparing of the score information of the second player with the score information of the first player, wherein the comparison result information includes multimedia information that represents an overtaking or a tie, which is prestored in the dart game apparatus, and wherein the multimedia information includes individual specialized multimedia information of the first and second players, which is received from the first and second players and stored in the dart game apparatus.

14. A dart game apparatus comprising:

a dart target configured to accommodate a thrown dart pin;

a sensor configured to sense a hit location of the thrown dart pin;

a processor configured to determine score information of two or more players and compare the score information of the two or more players based on the hit location of the thrown dart pin sensed by the sensor; and a display including a first area displaying score information of a first player among the two or more players and a second area displaying score information of a second player among the two or more players, the display configured to output an event effect determined based on a result of comparing the score information of the two or more players, wherein the event effect includes an effect that represents an overtaking or a tie which is prestored in the dart game apparatus, and wherein the effect that represents an overtaking or a tie, which is prestored in the dart game apparatus, includes individual specialized effects of the first and second players, which are received from the first and second players and stored in the dart game apparatus.

15. The dart game apparatus of claim 14, wherein the display displays the event effect in one of the first area and the second area.

16. The dart game apparatus of claim 15, wherein the processor compares the score information of the two or more players with each other to select an overtaking or a tie event effect when a dominance of the score information of the first player and the score information of the second player is changed, and the display outputting the selected overtaking event effect.

* * * * *